US012574385B1

(12) United States Patent
Dixit

(10) Patent No.: US 12,574,385 B1
(45) Date of Patent: Mar. 10, 2026

(54) SYSTEMS AND METHODS FOR IMPROVING ACCESS CONTROL FOR SOFTWARE APPLICATION

(71) Applicant: FMR LLC, Boston, MA (US)

(72) Inventor: Siddharth Dixit, Apex, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/975,349

(22) Filed: Dec. 10, 2024

(51) Int. Cl.
*H04L 9/40* (2022.01)

(52) U.S. Cl.
CPC .......... *H04L 63/105* (2013.01); *H04L 63/102* (2013.01); *H04L 63/10* (2013.01); *H04L 63/101* (2013.01); *H04L 2463/082* (2013.01)

(58) Field of Classification Search
CPC ..... H04L 63/10; H04L 63/101; H04L 63/102; H04L 63/105; H04L 2463/082
See application file for complete search history.

(56) References Cited

U.S. PATENT DOCUMENTS

| | | | | |
|---|---|---|---|---|
| 10,216,913 | B2 * | 2/2019 | Yang ....................... | G06F 21/44 |
| 11,902,327 | B2 * | 2/2024 | Wood ...................... | H04L 63/10 |
| 2014/0344896 | A1 * | 11/2014 | Pak ..................... | H04L 63/0861 726/4 |
| 2019/0334921 | A1 * | 10/2019 | Pattar ................... | H04L 9/3271 |
| 2020/0244664 | A1 * | 7/2020 | Pate .................... | H04L 63/0807 |
| 2021/0211470 | A1 * | 7/2021 | Wood ..................... | H04L 63/08 |
| 2025/0062949 | A1 * | 2/2025 | Nimmagadda ..... | H04L 41/0843 |

OTHER PUBLICATIONS

"Multi-Factor Authentication Policy"—St. Mary's College of California, Information Technology Policy, Aug. 27, 2024 https://www.stmarys-ca.edu/sites/default/files/2024-08/SMC-Multi-Factor-Authentication-Policy-2.0_0.pdf (Year: 2024).*
"Selecting Secure Multi-Factor Authentication Solutions" - NSA, Cybersecurity Information, Jul. 31, 2024 https://media.defense.gov/2024/Jul/31/2003515137/-1/-1/1/MULTIFACTOR_AUTHENTICA-TION_SOLUTIONS_UOO17091520.PDF (Year: 2024).*

* cited by examiner

*Primary Examiner* — Randy A Scott
(74) *Attorney, Agent, or Firm* — Cesari and McKenna, LLP

(57) ABSTRACT

Systems and methods are described for improving access control for a software application. A cloud platform may include a software application and an authorization sidecar. When a user attempts to access a resource, of the software application, that is associated with a first security level, the authorization sidecar performs authorization on the user based on a general authorization procedure and a specific authorization procedure. The user has access to the resource associated with the first security level after being authorized. When a user attempts to access a resource, of the software application, that is associated with a second security level, the authorization sidecar performs authorization on the user based on the general authorization procedure. The user has access to the resource associated with the second security level after being authorized.

24 Claims, 12 Drawing Sheets

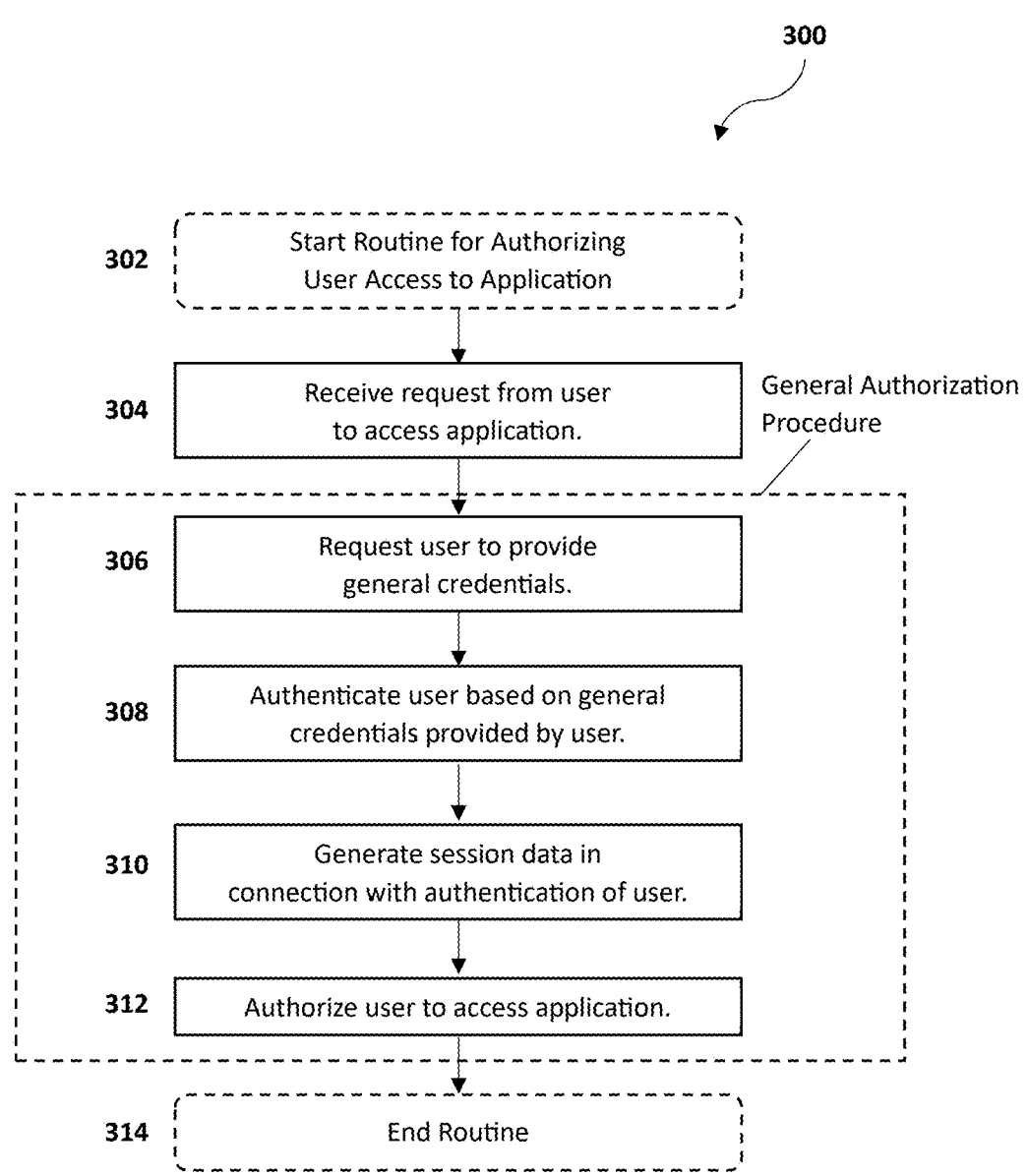

300

302    Start Routine for Authorizing
User Access to Application

304    Receive request from user
to access application.

General Authorization
Procedure

306    Request user to provide
general credentials.

308    Authenticate user based on general
credentials provided by user.

310    Generate session data in
connection with authentication of user.

312    Authorize user to access application.

314    End Routine

FIG. 3

Fidelity Application

To be authorized to access the application, please provide your general credentials (username + password) for authentication. Thank you.

| | |
|---|---|
| Username | Kjohnson |

| | |
|---|---|
| Password | ************** |

Submit

FIG. 4A

Fidelity Application

We have successfully authenticated your credentials. You are now authorized to have access to the application including resources (e.g., features, files) that are associated with the second security level.

To access a particular resource that is associated with the first security level, please submit further credentials that are specific to the particular resource. Thank you.

FIG. 4B

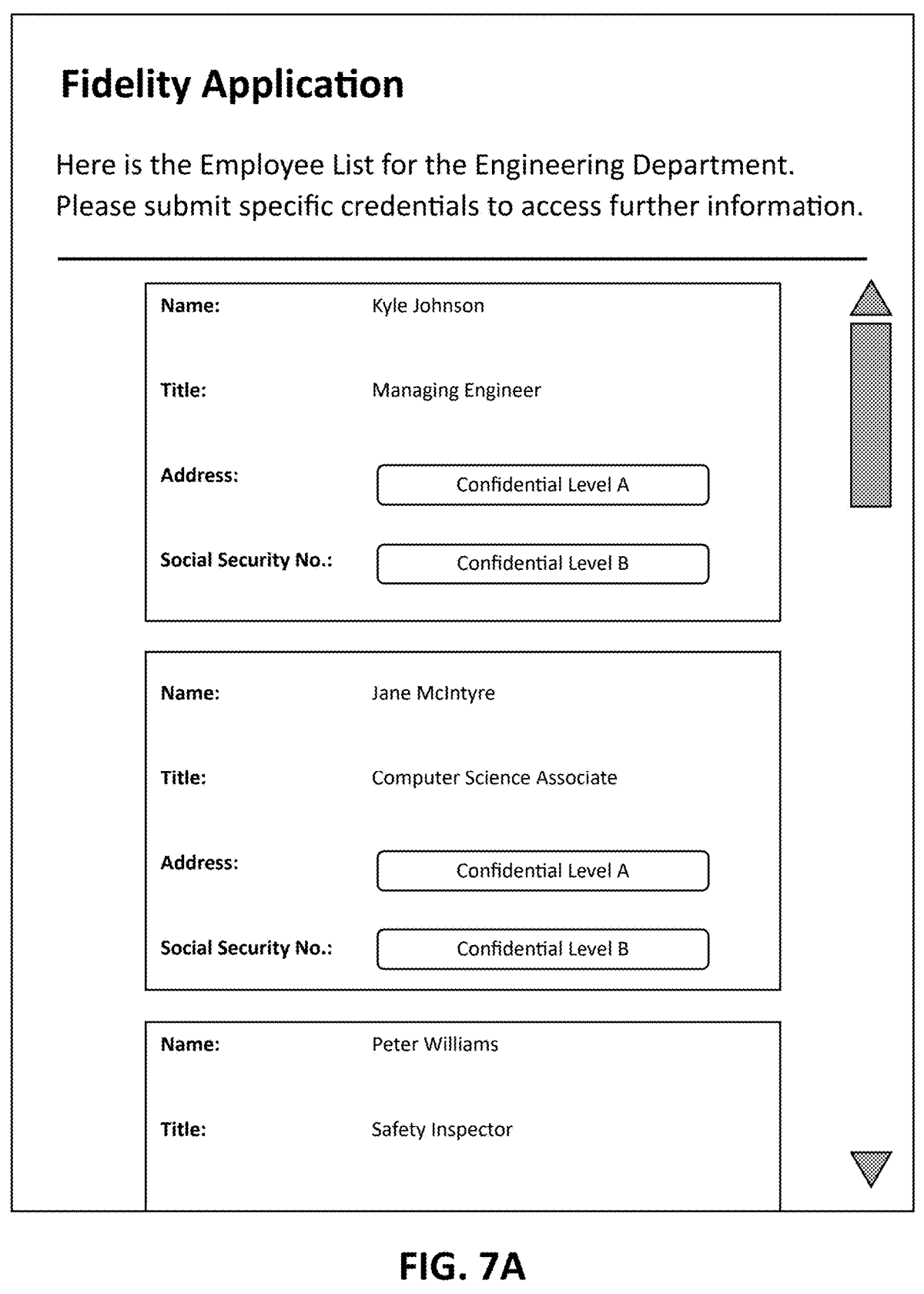

Fidelity Application

Here is the Employee List for the Engineering Department.
Please submit specific credentials to access further information.

---

Name:                Kyle Johnson

Title:               Managing Engineer

Address:             [ Confidential Level A ]

Social Security No.: [ Confidential Level B ]

---

Name:                Jane McIntyre

Title:               Computer Science Associate

Address:             [ Confidential Level A ]

Social Security No.: [ Confidential Level B ]

---

Name:                Peter Williams

Title:               Safety Inspector

FIG. 7A

Figure 7C:
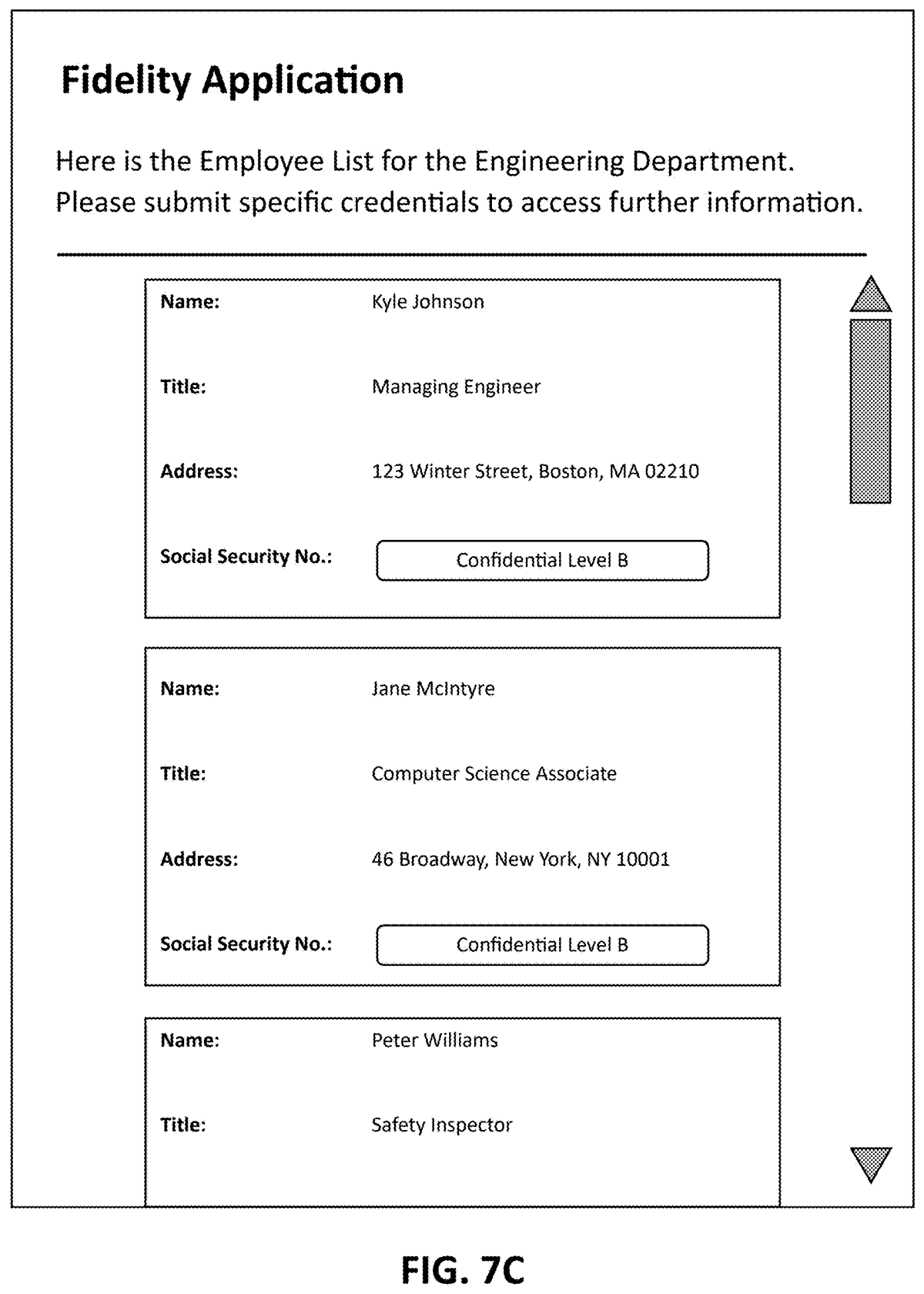

Fidelity Application

Here is the Employee List for the Engineering Department.
Please submit specific credentials to access further information.

---

Name:        Kyle Johnson

Title:        Managing Engineer

Address:        123 Winter Street, Boston, MA 02210

Social Security No.:     [ Confidential Level B ]

Name:        Jane McIntyre

Title:        Computer Science Associate

Address:        46 Broadway, New York, NY 10001

Social Security No.:     [ Confidential Level B ]

Name:        Peter Williams

Title:        Safety Inspector

| Memory 910 |
| Operating System 912 |
| General Authorization Module 914 |
| Specific Authorization Module 916 |
| Access Control Manager 918 |

Processor 902

Network Interface 904

Computer Readable Medium Drive 906

Input/Output Device Interface 908

SYSTEMS AND METHODS FOR IMPROVING ACCESS CONTROL FOR SOFTWARE APPLICATION

TECHNICAL FIELD

This application relates generally to systems and methods, including computer program products, for improving access control for a software application.

BACKGROUND

The notion of access control is paramount to ensuring that data in, for example, an organization (e.g., government agency, non-profit organizations, company, etc.) is secure, in which there is no unauthorized access to such data. It may be important to protect such data because it may include sensitive information such as blueprints of cutting-edge technology, intellectual property (e.g., trade secrets), and/or security credentials. To implement access control, administrators may limit the ability of users associated with the organization (e.g., employees of a government agency) to access functions or resources provided by, for example, a software application (owned by the organization) that is utilized by employees to perform work for the organization.

In a first approach, administrators may assign roles to each user that defines a set of permissions that grant access to specific resources provided by the application. There may be many roles, and one or more users may share the same role (e.g., manager, information technology (IT) administrator, engineer, etc.). Due to such sharing, some users may have unauthorized access to certain resources due to the scope of the permissions provided by the role. For example, there may be many levels of engineers in an organization (e.g., intern engineer, junior engineer, mid-level engineer, senior engineer, managing engineer) or types of engineers in an organization (e.g., electrical engineer, computer engineer, electronics engineer, telecommunications engineer, etc.). As such, assigning the role of "engineer" to each user associated with the title of engineering may lead to unintended consequences. In one case, the junior engineers may have access to documents having sensitive information (e.g., trade secrets) that are being managed by the senior engineers. In another case, the intern engineer may be able to modify or edit projects that are being handled by the engineering team. In either case, if the user was malicious, there could be a negative consequence of having unauthorized access to such information (e.g., user can steal trade secrets or sabotage projects).

While a solution to the aforementioned problem may include granting roles based on each unique title (e.g., one role for intern engineers and another role for electrical engineers) that exists within the organization, it is still a problem when there are tens of thousands of titles (which can be found in organizations having hundreds of thousands of users (e.g., employees) that are associated with the organization). Administrators (e.g., IT administrators) may be required to update each the permissions of each title based on the ever-changing policies of an organization. As a result, it becomes difficult to keep track of each and every single one of the roles. This becomes a problem when some roles still retain the permissions (e.g., new company policy restricts a junior engineer from accessing trade secrets) due to an error on the part of the administrator (e.g., administrator forgets to revoke the permission; therefore, junior engineer still has access to trade secrets).

In a second approach, the administrator uses a more granular process for granting permissions to users. More specifically, the administrator may grant customized access to users. In other words, each time a user joins an organization (e.g., is hired or volunteers), the administrator may manually grant permissions that, as a whole, are specifically tailored to the user. For example, the administrator may build a list of resources (e.g., applications, specific resources in the applications, files, etc.) that the user is allowed to access. Such list may be different even from users having the same title (e.g., one junior engineer may have access to files in a specific hard drive, but another junior engineer may not have access to such same hard drive). However, such approach may be time consuming, especially when there are hundreds of thousands of users (e.g., employees) that are associated with the organization. In addition, the administrator may need to determine (i.e., do research) which resource that the user can access based on policies of the organization. Because the permissions are customized to each user, the research process further adds delay to this approach.

As can be seen by the aforementioned approaches, access control is currently inefficient. There needs to be a better approach to ensuring the efficiency of access control while maintaining security for resources in an organization.

SUMMARY

The present disclosure, in one aspect, features a computing system for improving efficiency in performing access control for a software application, the system comprising a server computing device having a memory for storing computer-executable instructions and a processor that executes the computer-executable instructions to: receive a request from a user to access a first resource provided by the software application, wherein the first resource is associated with a first security level, which allows the user to access the first resource after the user is authorized based on a general authorization procedure that is associated with authorizing users of the software application and a specific authorization procedure that is associated with authorizing access to the first resource; perform the general authorization procedure by authorizing the user based at least on a user profile associated with the user and an access control policy associated with the software application, and wherein the access control policy indicates users that are permitted to access one or more resources of the software application; perform, after determining that the user has been authorized according to the general authorization procedure, the specific authorization procedure by transmitting a request to have the user provide a specific credential to the software application; and permit the user to access the first resource after receiving the specific credential from the user.

Accessing a resource of the one or more resources of the software application includes at least one of retrieving information from the resource, modifying or updating the resource, executing the resource, and removing the resource. The specific credential includes at least one of a passcode, a physical token, facial recognition, one or more fingerprints, retinal scanning, an authenticator software application, answers to one or more security questions, a code transmitted to the user via at least one of email, short message service (SMS), and a software application. The computer-executable instructions further cause the processor to perform operations to: receive a request from a user to access a second resource on the software application, wherein the second resource is associated with a second security level, which allows the user to perform the access the second resource after the user is authorized based on the general authorization procedure. The computer-executable instructions further cause the processor to perform operations to: permit the user to access the second resource after performing the general authorization procedure by authorizing the user based at least on a user profile associated with the user and an access control policy associated with the software application. The software application includes a first set of resources that is associated with the first security level and a second set of resources that are associated with a second security level, wherein resources in the first set of resources are accessible after being authorized by the general authorization procedure and the specific authorization procedure, and wherein the second set of resources are accessible after being authorized by the general authorization procedure. Each resource in the first set of resources is associated with a unique specific authorization procedure, such that a user provides a different specific credential in connection with each unique specific authorization procedure. A resource in the first set of resources is a file that includes visible information and hidden information, wherein a user who is authorized by the general authorization procedure is permitted to access the visible information and a user who is authorized by the specific authorization procedure is permitted to access both the visible information and the hidden information. Users are permitted to access the second set of resources after logging into their respective accounts that are associated with the software application, and wherein the users log into their respective accounts by providing a login credential to the software application, the login credential being different from the specific credential. The software application is running in a container on a container orchestration system, and wherein the general authorization procedure and the specific authorization procedure are executed by a sidecar that is associated with the container. The container orchestration system is implemented using Kubernetes and the sidecar uses Open Agent Policy (OPA) to implement access control. When the software application receives a request from a user to access a resource of the software application, the software application transmits a request to have the sidecar authorize the user according to at least one of the general authorization procedure and the specific authorization procedure.

The present disclosure, in another aspect, features a computerized method for improving efficiency in performing access control for a software application, the method comprising: receiving a request from a user to access a first resource provided by the software application, wherein the first resource is associated with a first security level, which allows the user to access the first resource after the user is authorized based on a general authorization procedure that is associated with authorizing users of the software application and a specific authorization procedure that is associated with authorizing access to the first resource; performing the general authorization procedure by authorizing the user based at least on a user profile associated with the user and an access control policy associated with the software application, and wherein the access control policy indicates users that are permitted to access one or more resources of the software application; performing, after determining that the user has been authorized according to the general authorization procedure, the specific authorization procedure by transmitting a request to have the user provide a specific credential to the software application; and permitting the user to access the first resource after receiving the specific credential from the user.

Accessing a resource of the one or more resources of the software application includes at least one of retrieving information from the resource, modifying or updating the resource, executing the resource, and removing the resource. The specific credential includes at least one of a passcode, a physical token, facial recognition, one or more fingerprints, retinal scanning, an authenticator software application, answers to one or more security questions, a code transmitted to the user via at least one of email, short message service (SMS), and a software application. The method further comprises receiving a request from a user to access a second resource on the software application, wherein the second resource is associated with a second security level, which allows the user to perform the access the second resource after the user is authorized based on the general authorization procedure. The method further comprises permitting the user to access the second resource after performing the general authorization procedure by authorizing the user based at least on a user profile associated with the user and an access control policy associated with the software application. The software application includes a first set of resources that is associated with the first security level and a second set of resources that are associated with a second security level, wherein resources in the first set of resources are accessible after being authorized by the general authorization procedure and the specific authorization procedure, and wherein the second set of resources are accessible after being authorized by the general authorization procedure. Each resource in the first set of resources is associated with a unique specific authorization procedure, such that a user provides a different specific credential in connection with each unique specific authorization procedure. A resource in the first set of resources is a file that includes visible information and hidden information, wherein a user who is authorized by the general authorization procedure is permitted to access the visible information and a user who is authorized by the specific authorization procedure is permitted to access both the visible information and the hidden information. Users are permitted to access the second set of resources after logging into their respective accounts that are associated with the software application, and wherein the users log into their respective accounts by providing a login credential to the software application, the login credential being different from the specific credential. The software application is running in a container on a container orchestration system, and wherein the general authorization procedure and the specific authorization procedure are executed by a sidecar that is associated with the container. The container orchestration system is implemented using Kubernetes and the sidecar uses Open Agent Policy (OPA) to implement access control. When the software application receives a request from a user to access a resource of the software application, the software application transmits a request to have the sidecar authorize the user according to at least one of the general authorization procedure and the specific authorization procedure.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method for authorizing user access to an application.

FIG. 4A is an example diagram illustrating an interface for accessing an application.

FIG. 4B is an example diagram illustrating an interface displayed to a user after being successfully authorized to access the application.

FIG. 7A is an example diagram illustrating an interface that displays a resource having multiple information items that are associated with at least one of a first security level and a second security level.

FIG. 7C is an example diagram illustrating an interface that displays a resource having multiple information items, in which a portion of the information items (associated with the first security level) that have been successfully authorized are visible to the user.

DETAILED DESCRIPTION

Figure 1:
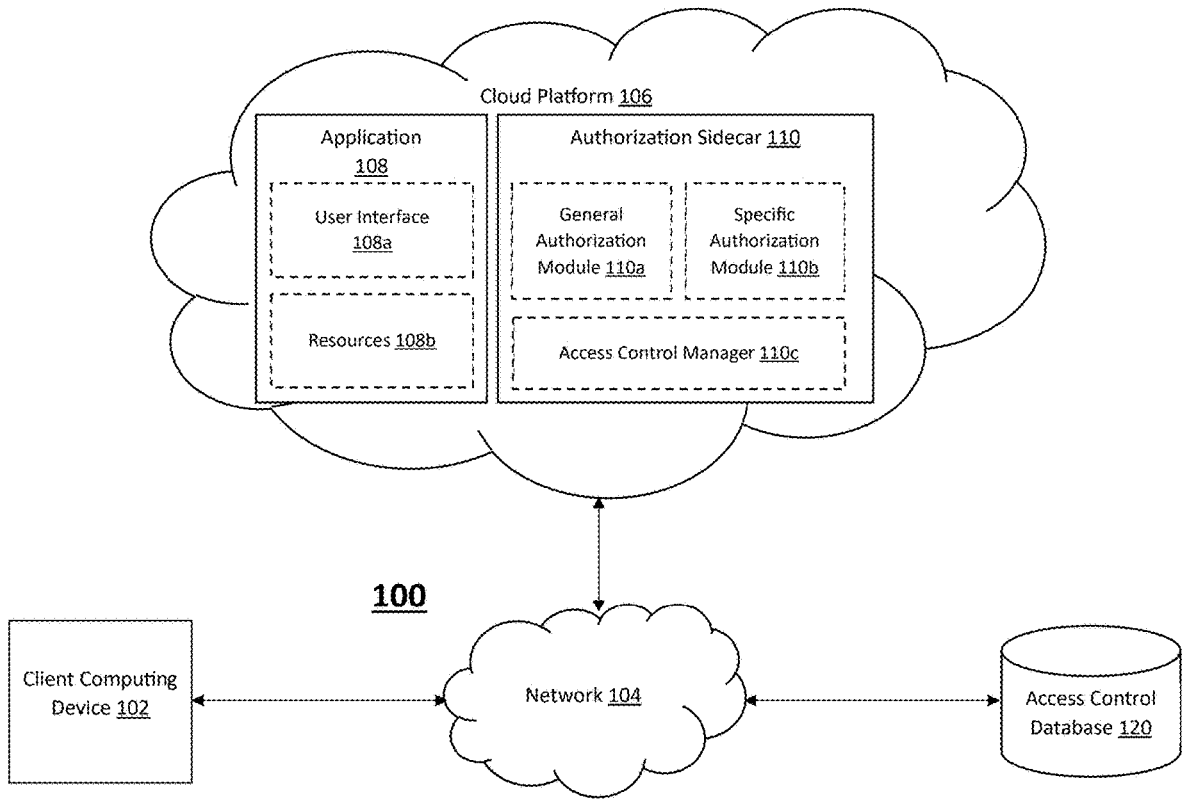
FIG. 1 is a block diagram of a system for improving access control for a software application.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a block diagram of a system for 100, which includes a client computing device 102, a cloud platform 106, and an access control database 120, all of which are capable of communicating with each other via a communication network 104.

The client computing device 102 can be coupled to a display device (not shown), such as a monitor, display panel, or screen. For example, client computing device 102 can provide a graphical user interface (GUI) via the display device to a user of corresponding device that presents output resulting from the methods and systems described herein and receives input from the user for further processing. Further, the client computing device 102, may include one or more applications that provide additional functionality to the client computing device 102. For example, the client computing device 102 may include a browser application that allows access to the services provided by devices on system 100, via a website, which can be reached by entering a uniform resource locator (URL). Exemplary client computing device 102 include but is not limited to desktop computers, laptop computers, tablets, mobile devices, smartphones, smart watches, Internet-of-Things (IoT) devices, and internet appliances. It should be appreciated that other types of client computing devices that are capable of connecting to components of the system 100 can be used without departing from the scope of invention. Although FIG. 1 depicts a single client computing device 102, it should be appreciated that system 100 can include any number of client computing devices 102.

The communication network 104 can be a local area network, a wide area network, a cellular network, or any type of network such as an intranet, an extranet (for example, to provide controlled access to external users, for example through the Internet), a private or public cloud network, the Internet, etc., or a combination thereof. In addition, the communication network 104 preferably uses TCP/IP (Transmission Control Protocol/Internet Protocol), but other protocols such as SNMP (Simple Network Management Protocol) and HTTP (Hypertext Transfer Protocol) can also be used. In some embodiments, the communication network 104 is comprised of several discrete networks and/or sub-networks (e.g., cellular to Internet).

The cloud platform 106 may include a cloud infrastructure, in which one or more server computing devices cooperate with each other (e.g., in the form of sharing resources) to provide one or more services (e.g., storage, executing applications). In some embodiments, each server computing device may include specialized hardware and/or software modules that execute on a processor and interact with memory modules of each server computing device, to transmit data to (or receive data from) other components of the server computing device, other server computing devices, or other devices in the system 100, as described herein. In some embodiments, the cloud platform 106 may be a container orchestration system. In some embodiments, the container orchestration system may be implemented using an infrastructure provided by Kubernetes.

In some embodiments, the server computing devices may communicate (via a substrate network) as if they existed in a local area network (LAN) environment. For example, the server computing devices may share a common subnet, and (from the perspective of the devices) directly communicate with one another without the user of complex routing protocols. In another example, unlike traditional LAN's, the devices within the cloud need not share a direct physical interconnection. Instead, the devices may be located in geographically diverse regions, and in some instances may themselves be virtual devices (e.g., virtual machines). A substrate (e.g., physical) network may encapsulate or otherwise alter communications from devices associated with the cloud platform 106 to create the illusion, from the point of view of the server computing devices within the cloud platform 106, that a LAN environment exists. Cloud platforms provide many advantages over traditional LANs, in that the configuration of the server computing devices can be changed dynamically, via software, without changing a physical configuration of the server computing devices. Moreover, the cloud platform 106 maintains many traditional benefits of LANs in that communications between the computing devices are relatively simple and secure.

In some embodiments, a single data center may include sufficient hardware to implement multiple cloud platforms, each of which may be isolated from each other (e.g., each cloud platform may include a separate substrate network).

For example, the cloud platform 106 may be a virtual private cloud (VPC), which is a private cloud computing environment that is isolated from other users on a public cloud platform (e.g., a public cloud platform may include the cloud platform 106 and one or more other cloud platforms). The isolation may be accomplished by creating a separate network environment for each VPC. In contrast, a public cloud platform may provide shared resources (e.g., storage, networking, etc.) among multiple users. Such resources can be accessed by anyone with an internet connection.

The cloud platform 106 includes several systems, frameworks, stores, and computing modules that execute on one or more processors of the each server computing device in the cloud platform 106. For example, the cloud platform 106 includes an application 108 and an authorization sidecar 110. The application 108 includes a user interface 108a and resources 108b. The authorization sidecar 110 includes a general authorization module 110a, a specific authorization module 110b, and an access control manager 110c. In some embodiments, the user interface 108a, the resources 108b, the general authorization module 110a, the specific authorization module 110b, and the access control manager 110c are specialized sets of computer software instructions programmed onto one or more dedicated processors in one or more server computing devices of the cloud platform 106 and can include specifically-designated memory locations and/or registers for executing the specialized computer software instructions.

In some embodiments, the application 108 may be divided into two or more components (e.g., computing modules), in which each component may be included in a different server computing device of the cloud platform 106. In such case, the server computing devices that include the application 108 may cooperated with each other to execute the services provided by the application 108. Likewise, in some embodiments, the authorization sidecar 110 may be divided into two or more components (e.g., computing modules), in which each component may be included in a different server computing device of the cloud platform 106. In such case, the server computing devices that include the authorization sidecar 110 may cooperate with each other to execute the services provided by the authorization sidecar 110.

Although the user interface 108a, the resources 108b, the user interface 108a, the resources 108b, the general authorization module 110a, the specific authorization module 110b, and the access control manager 110c may execute within different server computing devices of the cloud platform 106, in some embodiments the functionality of the user interface 108a, the resources 108b, the user interface 108a, the resources 108b, the general authorization module 110a, the specific authorization module 110b, and the access control manager 110c can be performed in a single computing device. Further, as shown in FIG. 1, the cloud platform 106 allows the user interface 108a, the resources 108b, the user interface 108a, the resources 108b, the general authorization module 110a, the specific authorization module 110b, and the access control manager 110c to communicate with each other in order to exchange data for the purpose of performing the described functions.

It should be appreciated that any number of computing devices, arranged in a variety of architectures, resources, and configurations (e.g., cluster computing, visual computing, cloud computing) can be used without departing from the scope of the invention. Exemplary functionality of the user interface 108a, the resources 108b, the user interface 108a, the resources 108b, the general authorization module 110a, the specific authorization module 110b, and the access control manager 110c are described in detail below.

The access control database 120 is a computing device (or, in some embodiments, may be a set of computing devices) that is configured to provide, receive and store various data associated with access control. The access control database 120 may include user profile data that is associated with users that have access to the application 108. For example, the user profile data may include at least one of a user identifier (e.g., a unique identifier for each user), username (e.g., the login identifier for the user), password (e.g., a password of the user), user's full name (e.g., user's first name, middle name, and last name), contact information (e.g., user's email address, user's phone number), roles (e.g., the permissions associated with the user), computing devices that are associated with the user (e.g., smartphone, tablet, desktop computer, laptop computer, etc.), and session data associated with each session of the user (e.g., a temporary connection between a user and the application). It should be noted that the authorization sidecar 110 may be allowed to access the access control data in the access control database 120.

Figure 2:
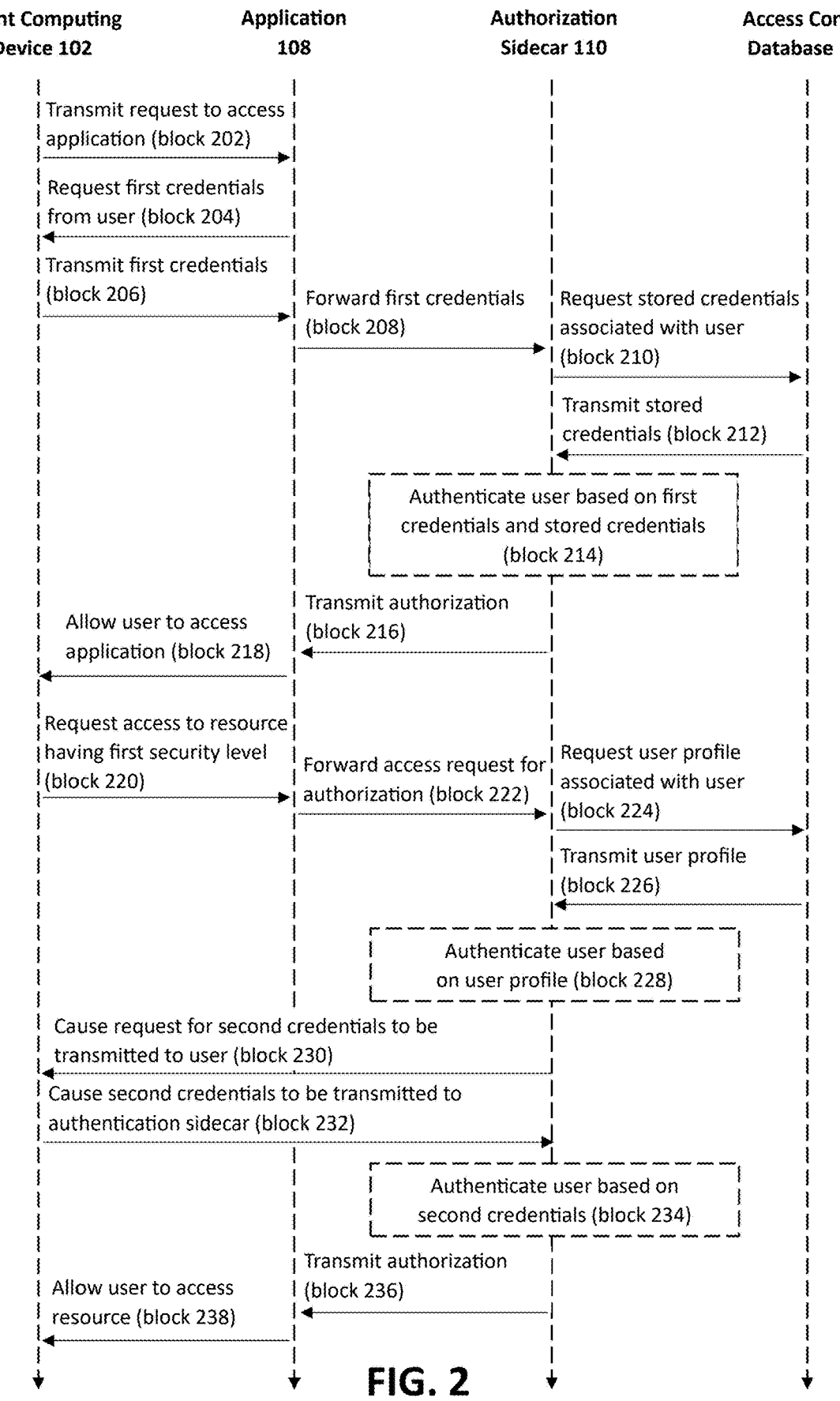
FIG. 2 is a system flow diagram for improving access control for a software application.

FIG. 2 illustrates an exemplary flow diagram corresponding to the system 100 of FIG. 1, in which the client computing device 102, the application 106, the authorization sidecar 110, and the access control database 120, communicate with each other to perform one or more actions. At block 202, the client computing device 102 transmits a request to access the application 108 (e.g., stored in the cloud platform 106). At block 204, the application 108 request first credentials from the user via the client computing device 102. At block 206, the client computing device 102 transmits the first credentials to the client computing device 102. At block 208, the application 108 forwards (or transmits) the first credentials to the authorization sidecar 110. At block 210, the authorization sidecar 110 requests stored credentials associated with user from the access control database 120. The stored credentials may allow the authorization sidecar 110 to authenticate the first credentials (e.g., the stored credentials may be a hash of the password of the user). At block 212, the access control database 120 transmits the stored credentials to the authorization sidecar 110.

At block 214, the authorization sidecar 110 authenticates the user based on the first credentials and the stored credentials. For example, in the case that the first credential was a password of the user, the authorization sidecar 110 may hash the password received from the client computing device 102 (at block 206) and perform authentication by determining whether the received password matches the password hash that is stored in the access control database 120. At block 216, in case that the authorization sidecar 110 was able to authenticate the user (e.g., based on the first credentials and the stored credentials), the authorization sidecar 110 authorizes user access to the application 108 (including resources of the application associated with a second security level) by transmitting such authorization to the application 108. At block 218, the application informs (e.g., transmits) the user that the user now has such aforementioned authorization (e.g., permitted to access the application and resources of the second security level).

At block 220, the client computing device transmits a request to access a resource (e.g., provided by the application) having a first security level. At block 222, the application 108 forwards the access request for authorization by the authorization sidecar 110. At block 120, the access control database 120 requests the user profile from the access control database 120. At block 228, the authorization sidecar 110 authenticates the user based on the user profile. More specifically, the user may have an ongoing login session with the application, in which the login session may be stored as session data in the user profile. The authorization sidecar 110 may perform authentication by determining whether the session is still ongoing (e.g., the user is still logged into the application).

At block 230, in case the authentication was successfully performed, the authorization sidecar 110 causes a request for second credentials to be transmitted to the user. For example, the authorization sidecar 110 may cause a third-party application to request the second credentials from the user (e.g., the application 108 provides an authorization code that is requested by the authorization sidecar 110 via an authenticator app). In another example the authorization sidecar 110 may directly transmit the request via the application 108 (e.g., the application 108 requests a one-time password from user that is sent from the authorization sidecar 110 via a messaging app (or application) on the client computing device 102).

At block 232, the client computing device causes second credentials to be transmitted to the authorization sidecar 110. For example, the user may transmit the second credentials to the authorization sidecar 110 via a third-party application (e.g., the user transmits the authorization code (provided by application 108) to the authorization sidecar 110 via the authenticator app). In another example, the user may transmit the second credentials to the authorization sidecar 110 via the application 108 (e.g., the user transmits the one-time password (provided by messaging app) to the authorization sidecar 110 via the application 108). At block 234, the authorization sidecar 110 authenticates the user based on the second credentials. At block 236, in case that the authorization sidecar 110 was able to authenticate the user (e.g., based on the second credentials), the authorization sidecar 110 authorizes user access to resources of the application associated with the first security level by transmitting such authorization to the application 108. At block 238, the application informs (e.g., transmits) the user that the user now has such aforementioned authorization (e.g., permitted to access resources of the first security level).

Example Routine for Authorizing User Access to Application

Figure 9:
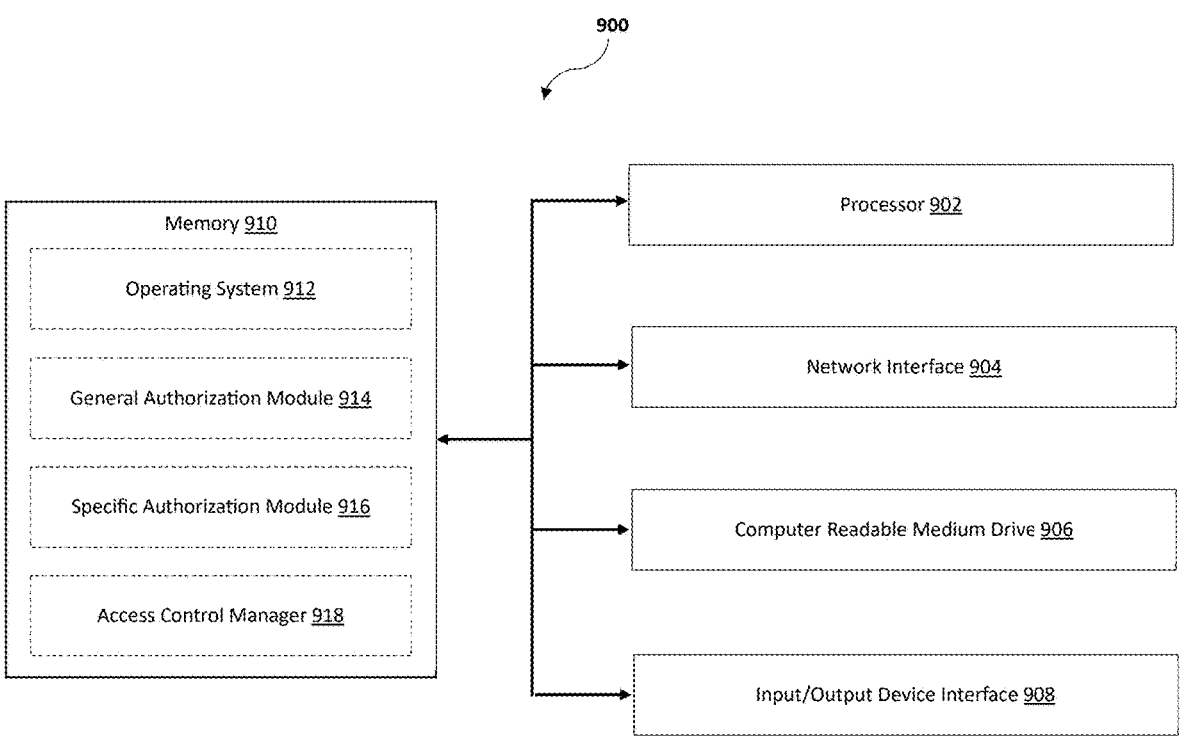
FIG. 9 is a diagram of an illustrative computing system.

When a routine described herein (i.e., 300, 500, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 900 shown in FIG. 9, and executed by one or more processors. In some embodiments, the routine 300, 500, 700, or portions thereof may be implemented on multiple processors, serially or in parallel.

FIG. 3 illustrates example routine 300 (beginning at block 302) for authorizing user access to an application 108, that is performed, for example, by at least one of the application 108 and the authorization sidecar 110. At block 304, the application 108 may receive a request from the user to access the application. The software application (or application or app) 108 may be a computer program that is configured to perform one or more tasks for one or more users. The software application 108 may be configured for various computing devices (e.g., smartphone, tablet computer, desktop computer, laptop computer, etc.). In some embodiments, the application 108a may be running on a container in the cloud platform 106. A software "container,"

provides a runtime environment without itself providing virtualization of hardware. Containers may be implemented within virtual machines to provide additional security, or may be run outside of a virtual machine instance. Examples of software applications 108 include word processors (e.g., for creating and editing text documents), web browsers (e.g., for accessing and viewing content on webpages of websites), video games, productivity tools (e.g., for sending and receiving email, for facilitating docketing, for creating and editing presentations, for creating and editing spreadsheets, etc.), and business software (e.g., customer relationship management, etc.).

The software application 108 may include one or more resources 108b that are associated with the features provided by the software application 108. For example, the resources 108b may include functionality (e.g., actions that the user can perform on the application 108, such as, for example, sending or viewing email, editing a text document, etc.) or objects (e.g., files, documents, images, code, or data that is stored in the application 108 or a computing system (e.g., client computing device 102, servers, servers that constitute the cloud platform 106), databases, devices (e.g., mouse, keyboard, screen, router, switches, printers, scanners, fax machines) that are connected to the client computing device 102. The software application 108 may include the user interface (UI) 108a, which may include a graphical user interface (GUI) that has one or more mechanisms (e.g., touchscreen or mouse) to allow the user to interact with one or more graphical elements on the GUI that are displayed to a user, for example, via a screen. The one or more mechanisms and the one or more graphical elements may allow the user to access the resources 108b associated with the application.

At block 306, the application 108 begins a general authorization procedure by requesting the user to provide general credentials. The general credentials may be information that verifies the identity of the user. For example, the software application 108 may be accessible to users who have registered previously to be, for example, a member of users who have access to the software application 108 (e.g., a user signs up for an email account associated with an email services app or user registers with a cloud storage app to store the user's photographs). During such registration, the user may have provided verification information that allows the authorization sidecar 110 to verify the user's identity. For example, verification information may include a username and password combination, biometric information (e.g., facial recognition, one or more fingerprints, retinal scanning), answers to one or more security questions, etc. In some embodiments, the general credentials are login credentials when the user attempts to access the application (e.g., by using the process of routine 300 in FIG. 3).

In some embodiments, when the application 108 receives the request from the user to access the application 108 (e.g., in block 304 of the routine 300), the application 108 forwards such request to the authorization sidecar 110 (e.g., to request the authorization sidecar 110 to authorize the user's request to access the application 108). In response, the authorization sidecar 110 (e.g., the general authorization module 110a) may commence the general authorization procedure by requesting the user to provide the general credentials. For example, the authorization sidecar 110 (e.g., the general authorization module 110a) may instruct the application 108 (e.g., via instructions) to request the user for the general credentials (e.g., via user input on the user interface 108a of the application 108). After receiving such general credentials via user input on the user interface 108a, the application 108 may forward such general credentials to the authorization sidecar 110 (e.g., the general authorization module 110*a*) for authentication.

The general authorization procedure may be a procedure that is performed for each user attempting to access the application 108*a*. For example, the general authorization procedure may include at least one of the process of requesting general credentials from the user (e.g., block 306), authenticating the user based on the received general credentials (e.g., block 308), generating session data in connection with authenticating of the user (e.g., block 310), and authorization (e.g., allowing or permitting) the user to access the application (e.g., block 312). In some embodiments, the general authorization procedure is the same for each user who has access to the application. In other words, there is no instance of one user being authorized with one authorization procedure (e.g., username and password combination) while another user is authorized with another different authorization procedure (e.g., biometric identification). More details regarding the general authorization procedure are discussed infra.

In some embodiments, when the user requests to access the application 108, the application 108 may provide a user interface (e.g., user interface 108*a*) that allows the user to input the requested general credentials. As shown by the example illustrated in FIG. 4A, the user interface displays the request for the general credentials (e.g., "To access the application, please provide your general credentials (username+password) for authentication"). The user interface includes a first input element that allows the user to input the username (e.g., "Kjohnson") and a second input element that allows the user to input the password (e.g., hidden by the series of asterisks). After inputting both the username and password, the user may activate the "submit" button to cause the username and password to be transmitted to the authorization sidecar 110 for authentication.

At block 308, the general authorization module 110*a* of the authorization sidecar 110 authenticates the user based on the general credentials provided by the user. More specifically, after the application 108 receives the general credentials from the user, the application 108 may transmit (or forward) the general credentials to the authorization sidecar 110. The authorization sidecar 110 may be a process or container that runs alongside another process or container (e.g., application 108). In some embodiments, the application 108 may be running in a first container on the cloud platform 106 and the authorization sidecar 110 may be running in a second container on the cloud platform 106. More specifically, the authorization sidecar 110 may provide additional functionality or services to the application 108.

In some embodiments, the authorization sidecar 110 may provide at least one of authorization services (e.g., determining whether a user or device is allowed or permitted to access the application 108 based at least on one of successful authentication of the user or device, role(s) associated with the user, permission(s) specific to the user, and predetermined rule(s)) and authentication services (e.g., verifying an identity of a user or device attempting to access the application 108) for the application 108. For example, the authorization sidecar 110 may implement an Open Policy Agent (OPA), which provides an open-source general-purpose policy engine and language for cloud infrastructure. In other words, the OPA may provide a unified authorization platform for cloud-native applications. The OPA may utilize Rego, which is a high-level declarative language for writing policy as code. For example, an administrator (e.g., IT administrator) may utilize Rego in generating (writing)

access control policies (e.g., determining to which resources one or more roles have access). In some embodiments, the application 108 may format communications (e.g., transmitting the general credentials) to the authorization sidecar 110 using the standard OPA format. In further embodiments, there may be two or more applications (e.g., application 108) that run on respective containers on the cloud platform 106. In addition, the authorization sidecar 110 may provide authorization services for the two or more applications (e.g., application 108) on the cloud platform 106.

After receiving the general credentials from the application 108, the general authorization module 110*a* may retrieve (or obtain) the stored general credentials that correspond to the user. For example, the stored general credentials may be stored in another location on the cloud platform (e.g., a container configured to store stored general credentials) or may be stored in the access control database 120. After obtaining the stored general credentials, the general authorization module 110*a* may authenticate the general credentials (e.g., received from the user) based on the stored general credentials. For example, in case that the general credentials (received from the user) included a username and password, the general authorization module 110*a* may determine whether the username in the received general credentials is the same as the username in the stored general credentials and whether the (hashed) password in the received general credentials is the same as the (hashed) password in the stored general credentials. In another example, in the case that the received general credentials were biometric information, the general authorization module 110*a* may determine whether the biometric information matches the corresponding biometric information in the stored general credentials.

At block 310, the general authorization module 110*a* generates session data in connection with the authentication of user. The session data may include at least one of a user identifier (e.g., a unique identifier for the user), authentication token (e.g., a token that verifies the user's identity), roles and permissions (e.g., the user's role and permissions within the application), session expiration time (e.g., the time at which the session expires), activity history (e.g., a record of the user's activity within the application). In some embodiments, the session data may take the form of (or include) a JavaScript Object Notation (JSON) Web Token (JWT), which is a standard for securely transmitting information between parties as a JSON object. The JWTs can be encrypted via signing using cryptographic algorithms. Further, JWTs can be transmitted using Hypertext Transfer Protocol (HTTP) headers. In some embodiments, the JWT may be implemented as JSON Web Encryption (JWE). The session data may be evidence that the user is still logged into the application 108, and therefore able to access the application 108. In some embodiments, after generating that session data, the authorization sidecar 110 includes the session data in a corresponding user profile (of the user) that is stored in the access control database 120.

At block 312, the application 108 authorizes (e.g., allows or permits) the user to access application. For example, after the authorization sidecar 110 (via the general authorization module 110*a*) has successfully authenticated the user, the general authorization module 110*a* transmits a general authorization notification to the application 108 thereby informing (or notifying) the application 108 that the user has been authenticated, and therefore the user is authorized (e.g., by the authorization sidecar 110) to access the application 108. As discussed below, the application 108 may, in turn, transmit a notification to inform the user that the user has been authorized to access the application 108.

In some embodiments, the general authorization procedure may authorize (e.g., allow or permit) the user to have access to other applications (e.g., applications other than the application 108) with a single authorization performed. For example, as discussed previously, the authorization sidecar 110 may be associated with two or more applications (e.g., perform authorization services for such applications). Therefore, when the user is authorized according to the process performed in routine 300 in FIG. 3, the user may automatically have access to those other applications without the user being required to perform another authentication process (e.g., login with username and password).

In some embodiments, after a successful authorization which allows the user to access the application 108, the user may be shown a user interface (e.g., user interface 108*a*), such as the user interface illustrated in FIG. 4B. As shown, the user is provided with further information regarding the successful authorization. For example, the user is informed that the user has now access to the application, and that the user is permitted to access resources 108*b* that are associated with the second security level. In some embodiments, the user is permitted to access every resource of the resources 108*b* that are associated with the second security level. In other embodiments, the user may not be capable of accessing every resource of the resource 108*b* that is associated with the second security level. In other words, the user may be restricted from accessing one or more resources associated with the second security level based on, for example, the role or permission levels that are associated with the user. The user is also provided with further information regarding how to access resources 108*b* associated with the first security level. In other words, the user may be able to access a particular resource associated with the second security level after submitting further credentials that are specific to the particular resource. More details regarding the first security level and the second security level are discussed infra. The routine ends at block 314.

Example Routine for Authorizing User Access to Requested Resource

When a routine described herein (i.e., 300, 500, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 900 shown in FIG. 9, and executed by one or more processors. In some embodiments, the routine 300, 500, 700, or portions thereof may be implemented on multiple processors, serially or in parallel.

Figure 5:
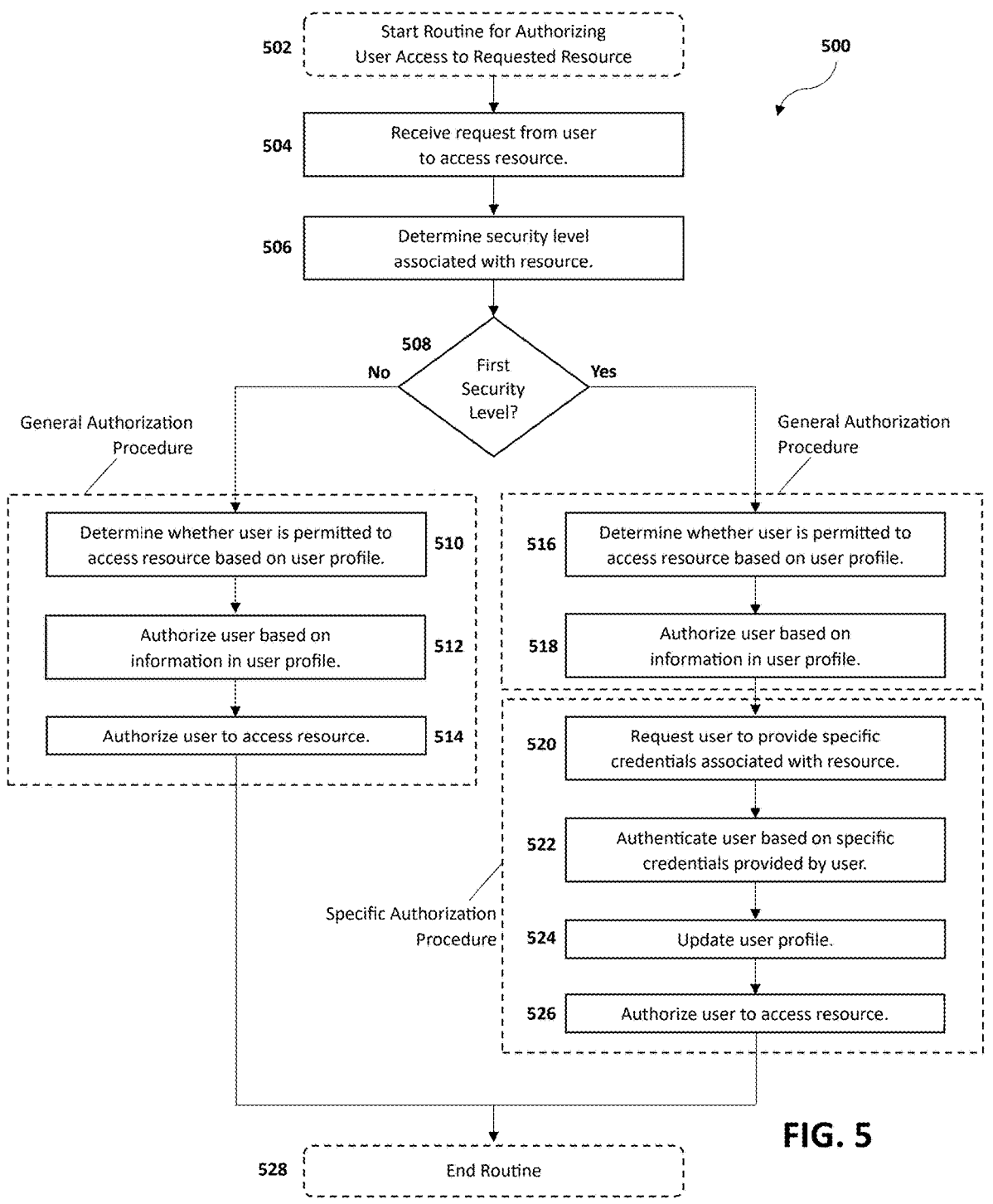
FIG. 5 is a flow diagram of a computerized method for authorizing user access to a requested resource.

FIG. 5 illustrates example routine 500 (beginning at block 502) for authorizing user access to a requested or particular resource of the resources 108*b* of the application 108, that is performed, for example, by at least one of the application 108 and the authorization sidecar 110. At block 304, the application 108 may receive a request from the user to access a particular resource of the resources 108*b*. The notion of accessing a resource may include at least one of retrieving information from the resource, modifying or updating the resource, executing the resource, and removing the resource. In some embodiments, accessing also means creating a resource (e.g., new object or new function) that did not exist previously. For example, the user may access a function that allows the user to create a new object (e.g., files). After receiving the request from the user, the application 108 may transmit an authorization request to the authorization sidecar 110 to determine whether to allow or permit the user to access the particular resource requested by the user. In some embodiments, the application 108 may format the authorization request using the Open Policy Agent (OPA) standard. In some embodiments, the application 108 may transmit the authorization request via the Hypertext Transfer Protocol (HTTP) standard.

For example, the authorization sidecar 110 may perform (e.g., during a general authorization procedure or a specific authorization procedure) authorization (e.g., after receiving the authorization request), which may be the process of determining whether the user or device is allowed or permitted to access the particular resource based at least on one of successful authentication of the user or device, role(s) associated with the user, permission(s) specific to the user, and predetermined rule(s). In another example, the authorization sidecar 110 may perform authentication (e.g., during a general authorization procedure or a specific authorization procedure), which is the process for verifying an identity of a user or device (e.g., confirming the identity of a user or device via credentials provided by a user or device).

At block 506, the authorization sidecar 110 may determine the security level of the particular resource requested by the user. For example, there may be one or more security levels that restrict access to the resources 108*b*. Each security level may be associated with a different credential. In other words, a resource associated with one security level may be accessible using one credential, while a resource associated with another security level may be accessible using a different credential. In some embodiments, each resource of the resources 108*b* may be designated as either a first security level (specific resources) or a second security level (general resources).

The general resources may be accessible by the user after the user has been authorized by the application 108 using a general authorization procedure (e.g., block 306 to block 310 of routine 300 in FIG. 3; block 510 and block 512 of routine 500 in FIG. 5; or block 516 and block 518 of routine 500 in FIG. 5). Further, the general resources may be associated with resources that are commonly used among users such as, for example, sending and receiving email, creating and editing a document (e.g., text, presentation, spreadsheet, etc.), accessing websites on the Internet, and communicating via voice (e.g., Internet phone calls) or video (e.g., video calling).

The specific resources may be accessible by the user after the user has been authorized by the application 108 using a specific authorization procedure (e.g., block 520, block 522, and block 524 of routine 500 in FIG. 5). Further, the specific resources may be associated with resources that are not commonly used or widespread among users. Such specific resources may include sensitive information. For example, a file may include documents pertaining to a trade secret. In another example, the specific resources may include functionality that performs substantial changes to the application (e.g., determining user roles, updating software on a computing device, installing applications on a computing device, etc.). The specific resources may be accessible when the user provides specific credentials (that are associated with the specific resource) to the sidecar authentication 110, which is explained in more detail infra.

In some embodiments, an object or functionality may be associated with both a first security level and a second security level (simultaneously). For example, a document may include both non-sensitive (e.g., user's full name) and sensitive information (e.g., user's social security number). As such, the user (when authorized under the general authorization procedure) may be authorized (e.g., by the authorization sidecar 110) to view the non-sensitive information in the document, but is restricted from viewing the sensitive information (e.g., the sensitive information may be blurred or covered up) until the user is able to be authorized (e.g., by the authorization sidecar 110) under the specific authorization procedure.

In some embodiments, each (e.g., every) user that is registered with the application may have the same role or permissions (e.g., manager and intern have the same role and/or privileges). In other words, each user is by default permitted to access resources that are associated with the second security level (e.g., general resources). Further, each user is capable of accessing the resources that are associated with the first security level (e.g., specific resources) if the user is informed of the specific credentials (e.g., a PIN, passcode, or secondary password, etc.), is associated with mechanism to provide such specific credentials (e.g., one-time password provided by a messaging application, or a push notification provided by an authorizing application, etc.), or is in possession of such specific credentials (e.g., a digital certificate).

In an illustrated scenario, in case that the user is requested by his or her manager to work on a project to which the user does not have yet access, the user is not required to request permission from an administrator to modify the user's role to access the files of the project. Instead, the user may request the specific credentials (that are associated with the files of the project) from the manager. Since the user is by default capable of accessing specific resources by providing the specific credentials, the user is allowed to access the files of the project immediately.

In the case that the particular resource is not associated with the first security level (block 508, no), the routine moves to block 510. At block 510, the general authorization module 110a of the authorization sidecar 110 commences the general authorization procedure by determining whether the user is allowed or permitted to access the particular resource based on the user profile (e.g., that is associated with the user). For example, the general authorization module 110a may retrieve (or obtain) the user profile from the access control database 120. As discussed previously, the user profile may include at least one of a user identifier (e.g., a unique identifier for each user), username (e.g., the login identifier for the user), password (e.g., the user's password), user's full name (e.g., user's first name, middle name, and last name), contact information (e.g., user's email address, user's phone number), roles (e.g., the permissions associated with the user), computing devices that are associated with the user (e.g., smartphone, tablet, desktop computer, laptop computer, etc.), and session data associated with each session of the user (e.g., a temporary connection between a user and the application).

In some embodiments, the authorization sidecar 110 may determine whether the user is allowed or permitted to access the particular resource based on the session data. For example, session data may include at least one of user identifier (e.g., a unique identifier for each user), an authentication token (e.g., a security token used to verify the user's identity), a session identifier (e.g., a unique identifier for the current session), timestamp (e.g., the time when the session began), expiration time (e.g., when the session expires), and device information (e.g., details about the device that the user is using, such as device model, device type (e.g., computer, smartphone, tablet, etc.), operating system, etc.). The session data may be created each time that the user successfully accesses the application 108 (e.g., block 310 of routine 300 in FIG. 3). Further, the session data may last for a predetermined time period before the user no longer granted access to the application 108 after the expiration time has passed. In other words, for the user to access the application 108 (after the session data expires), the user may be requested to perform the blocks 302 to 314 of routine 300 in FIG. 3 again. While the session data is active (i.e., not expired), the user is permitted to access any resource of the resources 108b (of the application 108) that is associated with the first security level.

In other embodiments, the general authorization module 110a of the authorization sidecar 110 may determine whether the user is permitted or allowed to access the particular resource based on the role (e.g., permissions) associated with the user. For example, the user may be associated with a role that does not authorize (e.g., allow or permit) the user to access the particular resource. As such, the general authorization module 110a may deny the user access to the resource. On the other hand, in the case, the role allows or permits the user to access the particular resource, the general authorization module 110a may authorize (e.g., allow or permit) the user to access the particular resource.

At block 512, the general authorization module 110a of the authorization sidecar 110 may authorize the user based on the information in the user profile. For example, the general authorization module 110a may determine that the user has access to the particular resource in the case that the general authorization module 110a determines that the session data is still active. In another example, the general authorization module 110a may determine that the user has access to the particular resource in the case that the general authorization module 110a determines that the role (e.g., permissions) associated with the user allow the user to access the particular resource. In a further example, the general authorization module 110a may authorize the user based on the session data and based on the user's role. In other words, the general authorization module 110a may authorize (e.g., allow or permit) the user to access the particular resource once the general authorization module 110a determines that the session data is active and that the role associated with the user allows or permits the user to access the particular resource.

At block 514, the application 108 permits or allows the user to access the particular resource. For example, after authorizing the user, the authorization sidecar 110 may transmit a communication to the application 108 (e.g., in OPA format and/or HTTP format) that the authorization sidecar 110 has successfully authorized the user, and that the application 108 can permit or allow the user access to the particular resource requested by the user.

In the case that the particular resource is associated with the first security level (block 508, yes), the routine moves to block 516. At block 516, the general authorization module 110a of the authorization sidecar 110 commences the general authorization procedure by determining whether the user allowed or permitted to access the particular resource based on the user profile (e.g., that is associated with the user). For example, the general authorization module 110a may retrieve (or obtain) the user profile from the access control database 120. As discussed previously, the user profile may include at least one of user identifier (e.g., a unique identifier for each user), username (e.g., the login identifier for the user), password (e.g., the user's password), user's full name (e.g., user's first name, middle name, and last name), contact information (e.g., user's email address, user's phone number), roles (e.g., the permissions associated with the user), computing devices that are associated with the user (e.g., smartphone, tablet, desktop computer, laptop computer, etc.), and session data associated with each session of the user (e.g., a temporary connection between a user and the application).

In some embodiments, the general authorization module 110*a* may determine whether the user is allowed or permitted to access the particular resource based on the session data. For example, session data may include at least one of a user identifier (e.g., a unique identifier for each user), an authentication token (e.g., a security token used to verify the user's identity), a session identifier (e.g., a unique identifier for the current session), timestamp (e.g., the time when session began), expiration time (e.g., when the session expires), and device information (e.g., details about the device that the user is using, such as device model, device type (e.g., computer, smartphone, tablet, etc.), operating system, etc.).

The session data may be created each time that the user successfully accesses the application 108 (e.g., block 310 of routine 300 in FIG. 3.). Further, the session data may last for a predetermined time period before the user no longer granted access to the application 108 after the expiration time has passed. In other words, for the user to access the application 108 (after the session data expires), the user may be requested to perform the blocks 302 to 314 of routine 300 in FIG. 3 again. While the session data is active (i.e., not expired), the user is permitted to access any resource of the resources 108*b* (of the application 108) that is associated with the first security level.

In other embodiments, the general authorization module 110*a* may determine whether the user is allowed or permitted to access the particular resource based on the role (e.g., permissions) associated with the user. For example, the user may be associated with a role that does not allow or permit the user to access the particular resource. As such, the general authorization module 110*a* may deny the user access to the resource. On the other hand, in the case, the role allows or permits the user to access the particular resource, the general authorization module 110*a* may authorize (e.g., allow or permit) access to the particular resource.

At block 518, the general authorization module 110*a* of the authorization sidecar 110 may authorize the user based on the information in the user profile. For example, the general authorization module 110*a* may determine that the user has access to the particular resource in the case that the general authorization module 110*a* determines that the session data is still active. In another example, the general authorization module 110*a* may determine that the user has access to the particular resource in the case that the general authorization module 110*a* determines that the role (e.g., permissions) associated with the user allow the user to access the particular resource. In a further example, the general authorization module 110*a* may authorize access for the user based on the session data and based on the user's role. In other words, the general authorization module 110*a* may authorize (e.g., allow or permit) the user to access the particular resource once the general authorization module 110*a* determines that the session data is active and that the role associated with the user allows or permits the user to access the particular resource.

In some embodiments, the general authentication module 110*b* may transmit instructions to execute the process associated with the specific authorization procedure after authenticating the user in block 518 of the routine 500 in FIG. 5. For example, the general authentication module 110*b* may cause code (e.g., written in Rego) corresponding to the specific authorization procedure to execute (e.g., execute by performing a process associated with the specific authorization module 110*b*).

At block 520, the specific authorization module 110*b* of the authorization sidecar 110 begins the specific authorization procedure by requesting the user to provide specific credentials associated with the particular resource. In the case that the user provides the correct or proper specific credentials, the specific authorization module 110*b* can authenticate the user. In other words, even though the user was authorized under the actions performed in blocks 516 and 518 of the routine 500 in FIG. 500, the user may still be restricted from accessing the particular resource until the user is authorized by the specific authorization module 110*b* according to the specific authorization procedure. As discussed previously, a user may be allowed or permitted to access a resource (e.g., of the resources 108*b*) associated with the first security level after being first authorized by the general authorization procedure, and then being authorized by the specific authorization procedure. In some embodiments, the specific authorization module 110*b* may determine the specific credential associated with the particular resource by accessing the metadata of the particular resource. In other embodiments, the specific authorization module 110*b* may determine the specific credential associated with the particular resource by accessing an associated access rule (e.g., which indicates the specific credential associated with the particular resource) from the access control database 120.

In some embodiments, the specific credentials may include specific information (e.g., a PIN, passcode, or secondary password, etc.) that is provided by the user. For example, specific authorization module 110*b* may cause the application 108 to request the user to input the specific information (including alphanumeric characters or symbols) onto the user interface 108*a* (e.g., graphical user interface (GUI), microphone, etc.) of the application 108. The user may then input (e.g., type, write, speak, etc.) the specific information into the user interface 108*a*. After inputting the specific information, the application 108 may transmit the specific information to the authorization sidecar 110. The specific authorization module 110*b* may authenticate the user in case that the user uploads the correct specific information (e.g., PIN code). For example, the user may be provided with the PIN code via another user (e.g., in person, through the phone, via text or email, etc.) who already has access to the resource to which the user is requesting access.

In other embodiments, the specific credentials include a specific object (e.g., file, token, digital certificate). For example, the specific authorization module 110*b* may instruct the application 108 to request the user to upload the specific object via the user interface 108*a* (e.g., graphical user interface (GUI), microphone, etc.) of the application 108. The user may then upload the specific object via the user interface 108*a*. After uploading the specific object, the application 108 may transmit the specific object to the authorization sidecar 110. The specific authorization module 110*b* may authenticate the user in case that the user uploads the correct specific object. For example, the user may be provided with the specific object via another user (e.g., via email attachment, or transfer by flash drive or cloud storage, etc.) who already has access to the resource to which the user is requesting access. In another example, the specific object may be a digital certificate, which is an electronic document that verifies the identity (e.g., public key) of the owner or possessor of the digital certificate.

In further embodiments, the specific credentials may be associated with a third-party authentication mechanism. For example, the specific authorization module 110b may instruct the application 108 to request the user to upload the specific object via the user interface 108a (e.g., graphical user interface (GUI), microphone, etc.) of the application 108. For example, the authentication mechanism may be a one-time password (OTP), in which the specific authorization module 110b may transmit a (random) password to at least one of a device (e.g., client computing device 102), email, or phone number that is associated with the user (e.g., according to the user profile in the access control database 120). The specific authorization module 110b may instruct the application 108 to display a message to the user (e.g., via the user interface 108a of the application 108) in which the message instructs the user to provide the one-time password that has been transmitted to the user (e.g., to the user's device). The authorization sidecar 110 may transmit the one-time password using a third-party application (e.g., a messaging application, an email application, or a phone application). It should be noted that the one-time password may be transmitted in an automated voice message (e.g., phone call) to a user's phone. When the user receives the one-time password, the user may submit the one-time password to the authorization sidecar 110 via the user interface 108a. The specific authorization module 110b may authenticate the user in case that the user submits the correct one-time password.

In some embodiments, the authentication mechanism may be an authorization code, in which the specific authorization module 110b may transmit a (random) code (including alphanumeric characters or symbols) to the user via the user interface 108a of the application 108. More specifically, the specific authorization module 110b may instruct the application 108 to transmit a message including the authorization code to the user (e.g., via the user interface 108a of the application 108) in which the message instructs the user to provide the authorization code to an authorization application (e.g., a third-party application) to which the user is registered. It should be noted that the use of a particular authorization application in conjunction with the authorization sidecar 110 may have been predetermined (e.g., selected) in advance by the administrator (e.g., information technology (IT) administrator). Further, the user may be instructed by administrator (e.g., directly or indirectly) to utilize (e.g., install) the authorization application on one or more of the user's device (e.g., client computing device 102). When the user inputs (and submits) the authorization code into the authorization application, the authorization application may transmit the authorization code to the authorization sidecar 110. The specific authorization module 110b may authenticate the user in case that the user submits the correct authorization code.

In other embodiments, the specific credentials may be associated with a third-party authentication mechanism. For example, the specific authorization module 110b may instruct the application 108 to request the user to confirm receipt of a push notification. For example, the specific authorization module 110b may instruct an authorization application, that is installed on the user's device (e.g., according to the user profile in the access control database 120), to push a notification to be displayed on the user interface of the user's device (e.g., client computing device 102). The push notification may, for example, include a message that confirms whether user is attempting to access the particular resource. In case the user is attempting to access the particular resource, the user confirms the request to access the particular resource by submitting a confirmation (e.g., confirmation button on the push notification displayed to the user on the user interface of the user's device). After receiving the confirmation, the authorization application may transmit a notification to the authorization sidecar 110 to confirm that the user is indeed attempting to access the resource. The specific authorization module 110b may authenticate the user in case that the specific authorization module 110b receives the notification.

Figure 6:
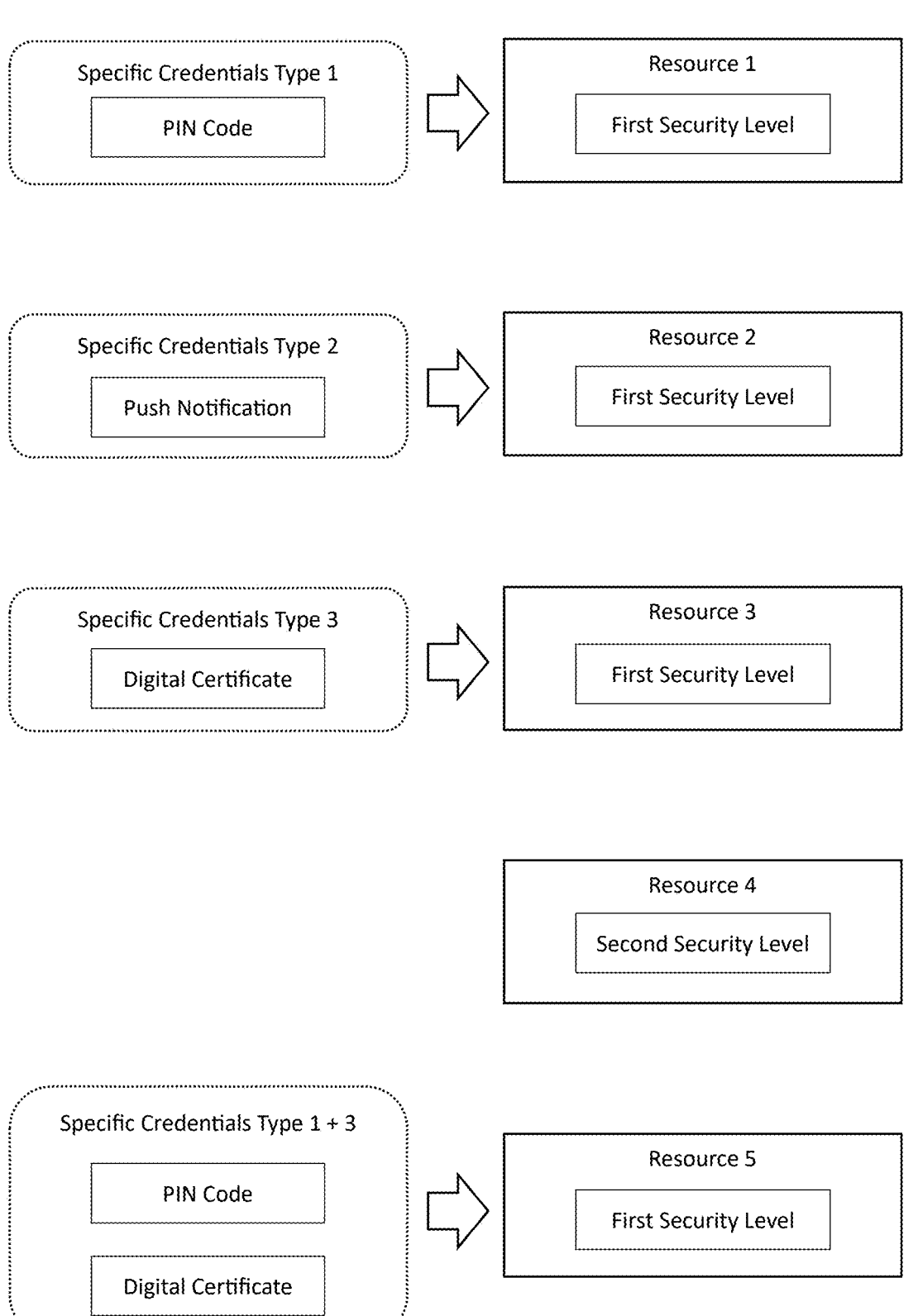
FIG. 6 is an example diagram illustrating the relationship between the multiple resources and the associated specific credentials that allow a user to access such multiple resources.

In some embodiments, two or more resources of the resources 108b in the application 108 may be associated with different types of specific credentials. For example, as shown in FIG. 6, there may be five resources in the application 108 (it should be noted that there may be more than five resources in the application (e.g., hundreds, thousands, millions, billions, trillions), and that the example shown in FIG. 6 is for illustrative purposes). The resource 1 may have a first security level and may be accessible when the user provides a specific credential type 1 (e.g., a PIN code). The resource 2 may have a first security level and may be accessible when the user provides a specific credential type 2 (e.g., confirming the push notification from an authorization application). The resource 3 may have a first security level and may be accessible when the user provides a specific credential type 3 (e.g., uploading a digital certificate). The resource 4 may have a second security level and may be accessible when the user is authenticated according to the general authorization procedure. As such, it is not necessary to provide any type of specific credentials to access the resource 4.

The resource 5 may have a first security level and may be accessible when the user provides two specific credential types (e.g., type 1 and type 3). In other words, the user submits both a specific credential associated with the specific credential type 1 (e.g., PIN code) and a specific credential associated with the specific credential type 2 (e.g., uploading a digital certificate) to access the resource 5. In other words, as shown by FIG. 6, the administrator may have the privilege to assign different specific authorization procedures for each resource of the resources 108b. It should also be noted that a set of two or more resources may be associated with a specific credential type and another set of two or more resources may be associated with another specific credential type. It should also be noted that even though two or more resources may be associated with the same specific credential type, the specific credentials may be different (e.g., resource A is accessible with PIN code X, but resource B is accessible with PIN code Y).

At block 522, the specific authorization module 110b authenticates the user based on the specific credentials provided by the user. More specifically, in case that the user submits the correct specific credential, the specific authorization module 110b determines that the user is permitted to have access to the particular resource requested by the user. In some embodiments, the specific authorization module 110a may determine (in addition to the authentication of the specific credentials provided by the user) whether the user is allowed or permitted to access the particular resource based on the role (e.g., permissions) associated with the user. For example, the user may be associated with a role that does not allow or permit the user to access the particular resource. As such, the specific authorization module 110a may deny the user access to the resource (e.g., even if the specific credentials have been authenticated by the specific authorization module 110b). On the other hand, in the case, the role allows or permits the user to access the particular resource, the specific authorization module 110a may authorize (e.g., allow or permit) access to the particular resource. It should be noted that the general authorization module 110*a* may perform such determination (e.g., allowed or permitted to access the particular resource based on the role (e.g., permissions) associated with the user) and the specific authorization module 110*a* may perform such determination again (e.g., allowed or permitted to access the particular resource based on the role (e.g., permissions) associated with the user) even after the general authorization module 110*a* has already performed such determination.

At block 524, the specific authorization module 110*b* updates the user profile. For example, the specific authorization module 110*b* may generate a new session (specific session) that is associated with the particular resource that the user is attempting to access. Further, the specific authorization module 110*b* may transmit instructions to have the access control database 120 add the specific session data to the user profile. The specific session may include similar types of information to the original session (general session) that began with the completion of the process in routine 300 in FIG. 3. For example, the specific session data may include at least one of a user identifier (e.g., a unique identifier for each user), an authentication token (e.g., a security token used to verify the user's identity), a session identifier (e.g., a unique identifier for the current session), timestamp (e.g., the time when the session began), expiration time (e.g., when the session expires), and device information (e.g., details about the device that the user is using, such as device model, device type (e.g., computer, smartphone, tablet, etc.), operating system, etc.).

In some embodiments, the access time period (e.g., from the timestamp (of when the specific session began) to the expiration time) corresponding to the specific session is different from the access time period (e.g., from the timestamp (of when the general session began) to the expiration time) corresponding to the general session (e.g., general session access time period is two hours, while the specific session access time period is thirty minutes). In other embodiments, when the general session access time period expires, the specific session access time period also expires (regardless of whether there is time still left in the specific session access time period). In some embodiments, after expiration of the general session data, the general authorization module 110*a* removes the general session data from the user profile in the access control database 120. In some embodiments, after expiration of the specific session data, the specific authentication module 110*a* removes the specific session data from the user profile in the access control database 120.

At block 526, the authorization sidecar 110 authorizes the user to access the resource associated with the first security level. For example, after the authorization sidecar 110 (via the specific authentication module 110*a*) has successfully authorized the user, the specific authentication module 110*a* transmits a specific authorization notification to the application 108 thereby informing (or notifying) the application 108 that the user has been authorized, and therefore the user is allowed or permitted to access the particular resource. In some embodiments, the application 108 may, in turn, transmit a notification to inform the user that the user has been authorized to access the resource associated with the first security level. The routine ends at block 528.

In some embodiments, a resource may be associated with both a first security level and a second security level simultaneously. For example, as shown in FIG. 7A, the user may be presented (e.g., by the application 108 via user interface 108*a*) with a document (e.g., list of employees in the engineering department) that includes one or more information items that correspond to a first security level (e.g., address, social security number) and a second security level (e.g., first and last name, job title). As shown, the one or more information items that correspond to the first security level may be hidden from the user (e.g., the user is not permitted to view the information items on the user interface 108*a*). In some embodiments, such information items that are associated with the first security level may be hidden by being blurred, covered, or redacted. Further, one of the information items associated with the first security level may be accessible using one type of specific credential, while another information item associated with the first security level may be accessible using another type of specific credential (e.g., specific credential for address vs. specific credential for social security number).

Figure 7B:
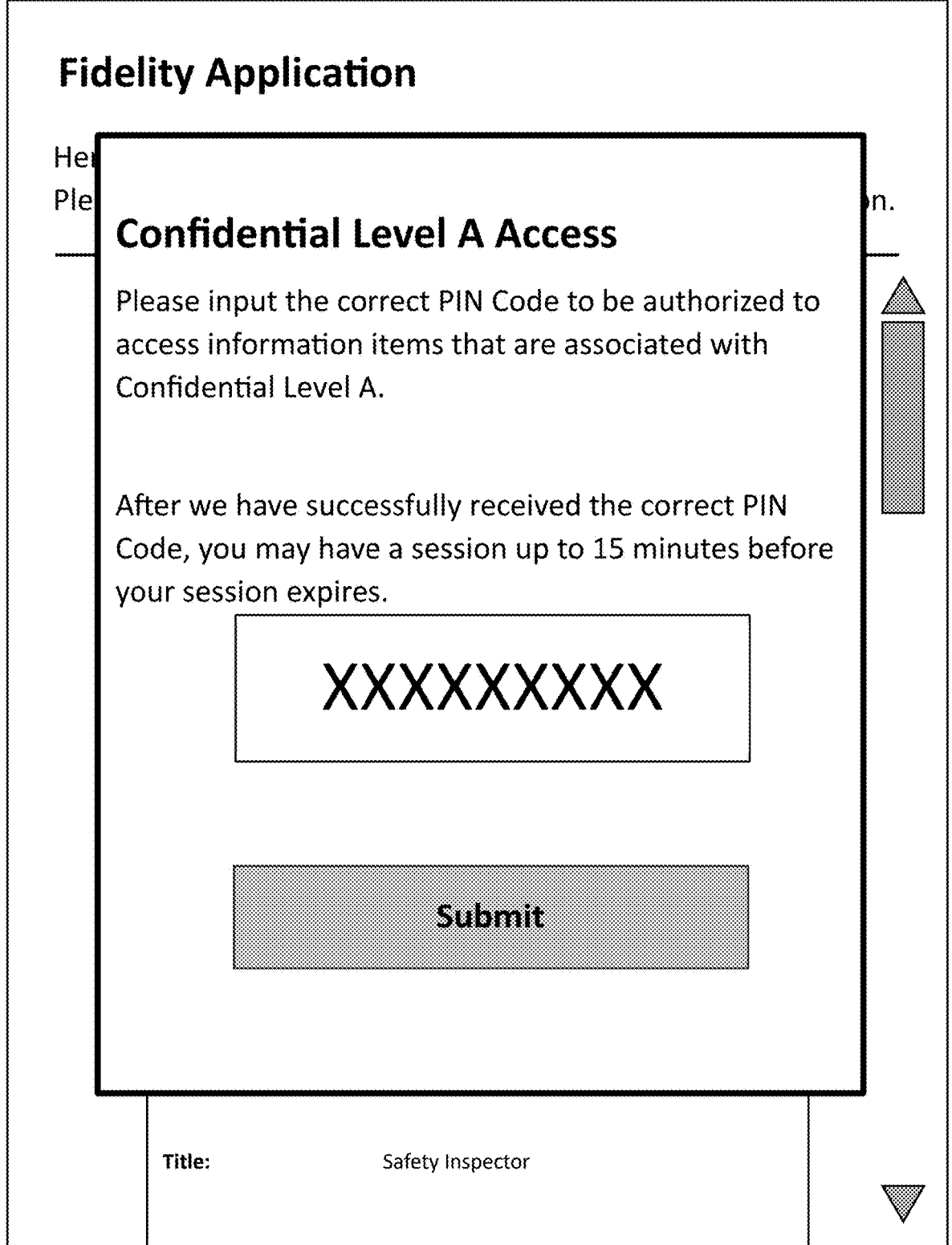
FIG. 7B is an example diagram illustrating an interface an interface that allows a user to submit specific credentials to access one or more information items (associated with the first security level) in the resource.

For example, as shown in FIG. 7B, the user may select to view the information items associated with "confidential level A" (e.g., on the user interface 108*a*). It should be noted that the terms confidential level (e.g., A, B, etc.) may signify to a user that the user may be required to provide different specific credentials for each of the information items that are hidden with the message "confidential level." In some embodiments, the administrator (e.g., information technology (IT)) may designate the confidential level as how sensitive the associated information time is (e.g., confidential level B includes more sensitive information than confidential level B, and confidential level C includes more sensitive information than confidential level B, etc.).

Therefore, the user may activate (e.g., select) the "Confidential Level A" button on the user interface. When the user activates the button, the user may be presented with another user interface (authorization user interface) overlaying the user interface that is associated with the employee list. As shown in the authorization user interface, the user is prompted to submit a specific credential in the form of a PIN code to access the one or more information items associated with confidential level A. Further, the authorization user interface may also inform the user as to the access time period (e.g., 15 minutes) that the user has before the session expires.

After being authorized (e.g., by the specific authorization module 110*b*), the user may be capable of accessing the information items associated with confidential level A. As shown in FIG. 7C, the address of each employee is no longer hidden. In other words, by being successfully authorized, the user is capable of accessing (e.g., viewing, editing, deleting) each information item that is associated with confidential level A (e.g., each address is visible to the user). The user is not required to submit specific credentials for each information item that is of the same confidential level. In some embodiments, the user may be required to submit specific credentials for each information item that is of the same confidential level (e.g., the user may be required to submit specific credentials twice for accessing the address of both Kyle Johnson and Jane McIntyre). In some embodiments, each specific credential that is associated with each information item that is of the same confidential level may be different (e.g., the user may be required to submit a PIN code to access the address of Kyle Johnson, but may be required to upload a digital certificate (or submit a different PIN code) to access the address of Jane McIntyre). Further, as shown in FIG. 7C, while the user is allowed or permitted to access (e.g., viewing, editing, deleting) the address of the employees (e.g., on the user interface 108*a*), the user is still not allowed or permitted to access (e.g., viewing, editing, deleting) the social security number of the employees. To view such social security numbers, the user may be required to submit specific credentials that are associated with confidential level B (e.g., such requirement may be presented to the user via a notification on the user interface 108*a*).

As discussed previously, in some embodiments, each (e.g., every) user that is registered with the application may have the same role or permissions (e.g., manager and intern have the same role and/or privileges). In other words, each user is by default permitted to access resources that are associated with the second security level (e.g., general resources). Further, each user is capable of accessing the resources that are associated with the first security level (e.g., specific resources) if the user is informed of the specific credentials (e.g., a PIN, passcode, or secondary password, etc.), is associated with mechanism to provide such specific credentials (e.g., one-time password provided by a messaging application, or a push notification provided by an authorizing application, etc.), or is in possession of such specific credentials (e.g., a digital certificate).

As a result of having the same role for each user, efficiency in access control is increased (i.e., an improvement in technology). This is because the administrator (e.g., IT administrator) is not required to be responsible for managing tens of thousands of roles in an organization. The administrator merely assigns a specific credential to one or more resources in an organization (e.g., a specific credential may be associated with a whole hard-disk drive or a group of folders in storage on the cloud). Further, it is easier for teams working on projects to integrate more team members into the project without going through the time-consuming process of requesting an administrator or IT department to access the resources of the project. An existing team member on the project may simply provide the specific credentials to the new team member to access the resources of the project. In case that a team member leaves, an administrator (e.g., leader of the team project) may simply change the specific credentials.

In addition, the aforementioned process also includes one or more features associated with the Zero Trust model. In other words, according to the Zero Trust model, no devices (or users or applications) should be trusted by default (even if they are already inside an organization's network). As a result, to implement the Zero Trust model, each request (e.g., regardless of origin) is verified before allowing or permitting user access, and users (or devices) are granted the minimum necessary permissions to perform their functions or responsibilities. In the context of the aforementioned process, a check is performed whenever a user is requesting to access a resource. For example, such checks are performed via at least one of the general authorization procedure and the specific authorization procedure (e.g., whenever the user is attempting to access a resource). Further, in some embodiments, the users are granted the minimum necessary permissions to perform their functions via access to the resources associated with the second security level (which include access to, for example, basic files, functions, or applications). To be granted permissions beyond the minimum necessary permissions, the user may be authorized via the specific authorization procedure. As a result of having features associated with the Zero Trust model, the process as described in routines 300 of FIG. 3, routine 500 of FIG. 5, and routine 800 of FIG. 8, allows for security to be enhanced or improved, for example, with respect to the system 100 of FIG. 1.

Example Routine for Generating Access Control Policy

When a routine described herein (i.e., 300, 500, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 900 shown in FIG. 9, and executed by one or more processors. In some embodiments, the routine 300, 500, 700, or portions thereof may be implemented on multiple processors, serially or in parallel.

Figure 8:
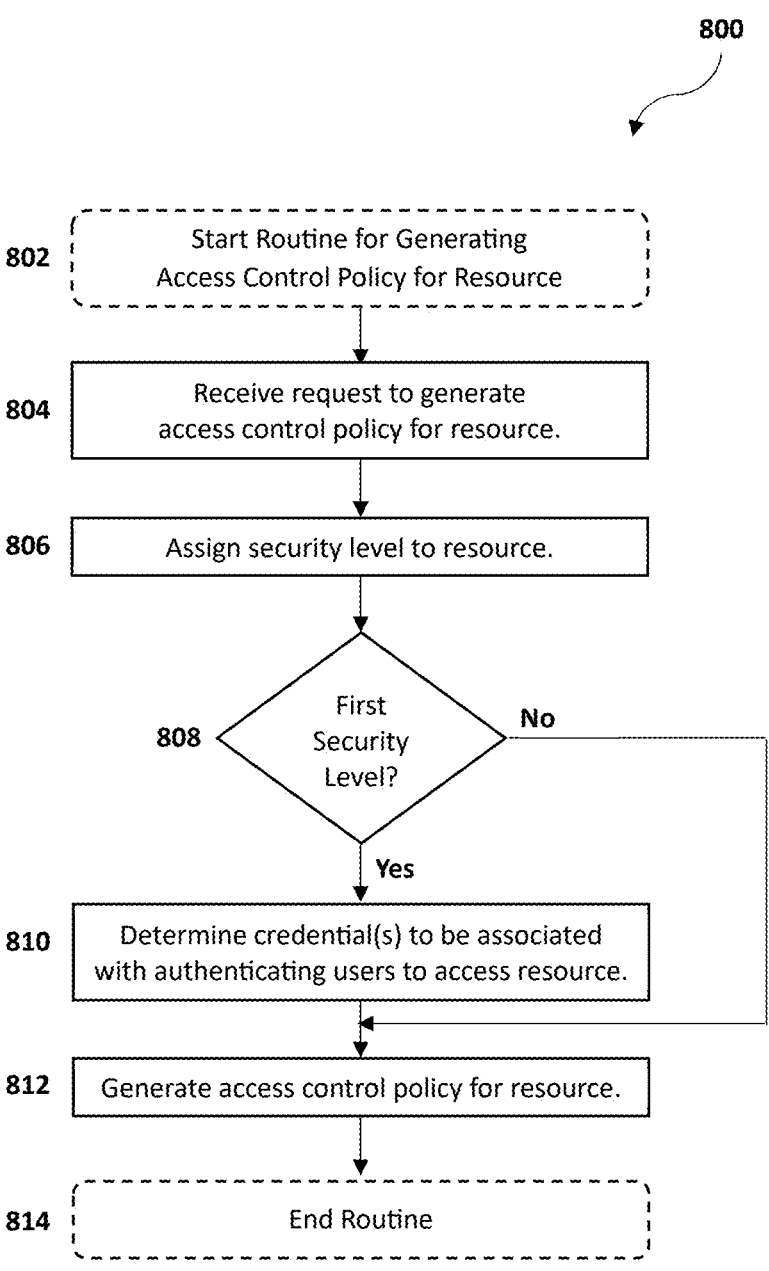
FIG. 8 is a flow diagram of a computerized method for generating access control policy for a resource.

FIG. 8 illustrates example routine 800 (beginning at block 802) for generating an access control policy for one or more resources of the resources 108*b*, that is performed, for example, by at least the access control manager 110*c* of the authorization sidecar 110. At block 304, the access control manager 110*c* may receive a request to generate an access control policy for the one or more resources. For example, an administrator (e.g., information technology (IT) administrator, project manager, owner of the oner or more resources) may be instructed to determine an access control policy for a particular resource that was newly created (e.g., a new engineering project that includes many files that may continuously grow until the project is completed). In some embodiments, the process in routine 800 may be used by an administrator to change the access control policy for one or more resources that are already associated with an existing access control policy. In some embodiments, the administrator may be the same user as the owner of the one or more resources. In other words, the owners of resources may have access to the access control policies of their resources without requiring going through the process of requesting an administrator to change the access control policy for a resource.

At block 806, the access control manager 110*c* may assign a security level to the one or more resources (e.g., upon receiving instructions from the administrator). For example, the access control manager 110*c* may assign a first security level or a second security level to the one or more resources. At block 808, the access control manager 106*c* determines whether the one or more resources are assigned to a first security level or a second security level. In the case that the access control manager 110*c* assigns a first security level to the one or more resources (block 808, yes), the routine 800 moves to block 810.

At block 810, the access control manager 110*c* determines one or more specific credentials to be associated with authenticating users so that such users can be authorized to access the one or more resources. For example, each file in the engineering project may be associated with the same specific credentials. Each new file that is added to the engineering project may automatically be assigned the same specific credentials as the other files that currently exist in the engineering project. In other example, two or more files in the engineering project may be associated with different specific credentials. In yet a further example, a file in the resource may be associated with two or more specific credentials. In some embodiments, there may be a centralized configuration source database to store multi-factor authentication (e.g., associated with specific credentials) at a resource and resource action level. As such, the administrator is capable of specifying, on a resource (name: profile; actions (value: can_view, user_login_config (level_of_assurance: 5)) configuration-based protection (e.g., a logged-in user can invoke a "can_view" action on a profile resource if the level of assurance is minimum of 5).

In the case that the access control manager 106*c* does not assign a first security level to the one or more resources (block 808, no), the routine 800 moves to block 812. In some embodiments, if the access control manager 106*c* does not assign a first security level to the one or more resources, the one or more resources are automatically associated with the second security level. At block 812, the access control manager 110c generates the access control policy for the one or more resources. In other words, the access control manager 110c generates, e.g., an access rule, that indicates how the one or more resources can be accessed. The routine ends at block 814.

In some embodiments, the access rule is stored in the access control database 120. As such, when the specific authorization module 110b attempts to determine which specific credential(s) are associated with the one or more resources (e.g., at block 520 in routine 500 of FIG. 5), the specific authorization module 110b may retrieve the access rule from the access control database 120. In some embodiments, each access rule may be associated with each resource in the resources 108b. In some embodiments, the access control manager 110c may store the access rule in the metadata of each resource in the resources 108b.

In some embodiments, an organization may include two or more subunits (e.g., departments, branches, offices, etc.). The files that are associated with each subunit may be assigned a different specific credential for access. For example, a first subunit (e.g., engineering department) may have files that can be accessed using a PIN code, while a second subunit (e.g., legal department) may have files that can be accessed using a one-time password. In other words, each subunit may have a different specific credential assigned to it.

Execution Environment

FIG. 9 illustrates various components of an example computing device 900 configured to implement various functionality described herein.

In some embodiments, the computing device 900 may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 900 may be implemented as webs services consumable via one or more communication networks. In further embodiments, the computing device 900 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 900 may include one or more processors 902, such as physical central processing units ("CPUs"); one or more network interfaces 904, such as network interface cards ("NICs"); one or more computer readable medium drives 906, such as a high density disk ("HDDs"), solid state drives ("SSDs"), flash drives, and/or other persistent computer readable media; one or more input/output drive interfaces 908; and one or more computer-readable memories 910, such as random access memory ("RAM") and/or other volatile non-transitory readable media.

The one or more computer-readable memories 910 may include computer program instructions that one or more computer processors 902 execute and/or data that the one or more computer processors 902 use in order to implement one or more embodiment. For example, the one or more computer-readable memories 910 can store an operating system 912 to provide general administration of the computing device 900. As another example, the one or more computer-readable memories 910 can store a general authorization module 914 (e.g., general authorization module 110a) for authorizing user access to an application (e.g., application 108) or general resources (e.g., of the resource 108b) associated with the application 108. In a further example, the one or more computer-readable memories 910 can store a specific authorization module 916 (e.g., specific authorization module 110b) for authorizing user access to specific resources (e.g., of the resource 108b) associated with the application 108. In yet another example, the one or more computer-readable memories 910 can store an access control manager 918 (e.g., access control manager 110c), which allows an administrator to determine which resources should be associated with a first security level and a second security level (as well as assign specific credentials to resources having a first security level).

Terminology

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Commu-nication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computing system for improving security in performing access control for a software application, the system comprising a server computing device having a memory for storing computer-executable instructions and a processor that executes the computer-executable instructions to:

receive an initial request from a user to access the software application;

perform a general authorization procedure in response to the initial request by authorizing the user based on at least a user profile associated with the user and an access control policy associated with the software application, wherein the access control policy indicates users that are permitted to access one or more resources of the software application;

create session data after the user is authorized under the general authorization procedure;

receive a request from a user to access a first resource provided by the software application after the user is authorized under the general authorization procedure, wherein the first resource is associated with a first security level requiring both the general authorization procedure that is associated with authorizing users of the software application and a specific authorization procedure that is associated with authorizing access to the first resource;

perform, after determining that the session data from the general authorization procedure remains active and the user has been authorized according to the general authorization procedure, the specific authorization procedure by transmitting a request to have the user provide a specific credential to the software application, wherein the first resource is specifically associated with the specific credential, and wherein the specific credential used to access the first resource is different from another specific credential used to access at least one other resource, associated with the first security level, that is provided by the software application, and wherein the specific credential used in the specific authorization procedure is different from the user profile used to perform the general authorization procedure; and permit the user to access the first resource after receiving the specific credential from the user.

2. The system of claim 1, wherein accessing a resource of the one or more resources of the software application includes at least one of retrieving information from the resource, modifying or updating the resource, executing the resource, and removing the resource.

3. The system of claim 1, wherein the specific credential includes at least one of a passcode, a physical token, facial recognition, one or more fingerprints, retinal scanning, an authenticator software application, answers to one or more security questions, a code transmitted to the user via at least one of email, short message service (SMS), and a software application.

4. The system of claim 1, wherein the computer-executable instructions further cause the processor to perform operations to:

receive a request from a user to access a second resource on the software application, wherein the second resource is associated with a second security level, which allows the user to perform the access the second resource after the user is authorized based on the general authorization procedure.

5. The system of claim 4, wherein the computer-executable instructions further cause the processor to perform operations to:

permit the user to access the second resource after performing the general authorization procedure by authorizing the user based at least on a user profile associated with the user and an access control policy associated with the software application.

6. The system of claim 1, wherein the software application includes a first set of resources that is associated with the first security level and a second set of resources that are associated with a second security level, wherein resources in the first set of resources are accessible after being authorized by the general authorization procedure and the specific authorization procedure, and wherein the second set of resources are accessible after being authorized by the general authorization procedure.

7. The system of claim 6, wherein each resource in the first set of resources is associated with a unique specific authorization procedure, such that a user provides a different specific credential in connection with each unique specific authorization procedure.

8. The system of claim 6, wherein a resource in the first set of resources is a file that includes visible information and hidden information, wherein a user who is authorized by the general authorization procedure is permitted to access the visible information and a user who is authorized by the specific authorization procedure is permitted to access both the visible information and the hidden information.

9. The system of claim 6, wherein users are permitted to access the second set of resources after logging into their respective accounts that are associated with the software application, and wherein the users log into their respective accounts by providing a login credential to the software application, the login credential being different from the specific credential.

10. The system of claim 1, wherein the software application is running in a container on a container orchestration system, and wherein the general authorization procedure and the specific authorization procedure are executed by a sidecar that is associated with the container.

11. The system of claim 10, wherein the container orchestration system is implemented using Kubernetes and the sidecar uses Open Agent Policy (OPA) to implement access control.

12. The system of claim 10, wherein, when the software application receives a request from a user to access a resource of the software application, the software application transmits a request to have the sidecar authorize the user according to at least one of the general authorization procedure and the specific authorization procedure.

13. A computerized method for improving efficiency in performing access control for a software application, the method comprising:

receiving, by a server computing device, an initial request from a user to access the software application;

performing, by the server computing device, a general authorization procedure in response to the initial request by authorizing the user based on at least a user profile associated with the user and an access control policy associated with the software application, wherein the access control policy indicates users that are permitted to access one or more resources of the software application;

creating, by the server computing device, session data after the user is authorized under the general authorization procedure;

receiving, by the server computing device, a request from a user to access a first resource provided by the software application after the user is authorized under the general authorization procedure, wherein the first resource is associated with a first security level requiring the general authorization procedure that is associated with authorizing users of the software application and a specific authorization procedure that is associated with authorizing access to the first resource;

performing, by the server computing device, after determining that the session data from the general authorization procedure remains active and the user has been authorized according to the general authorization procedure, the specific authorization procedure by transmitting a request to have the user provide a specific credential to the software application, wherein the first resource is specifically associated with the specific credential, and wherein the specific credential used to access the first resource is different from another specific credential used to access at least one other resource, associated with the first security level, that is provided by the software application, and wherein the specific credential used in the specific authorization procedure is different from the user profile used to perform the general authorization procedure; and permitting, by the server computing device, the user to access the first resource after receiving the specific credential from the user.

14. The method of claim 13, wherein accessing a resource of the one or more resources of the software application includes at least one of retrieving information from the resource, modifying or updating the resource, executing the resource, and removing the resource.

15. The method of claim 13, wherein the specific credential includes at least one of a passcode, a physical token, facial recognition, one or more fingerprints, retinal scanning, an authenticator software application, answers to one or more security questions, a code transmitted to the user via at least one of email, short message service (SMS), and a software application.

16. The method of claim 13, further comprising:

receiving, by the server computing device, a request from a user to access a second resource on the software application, wherein the second resource is associated with a second security level, which allows the user to perform the access the second resource after the user is authorized based on the general authorization procedure.

17. The method of claim 16, further comprising:

permitting, by the server computing device, the user to access the second resource after performing the general authorization procedure by authorizing the user based at least on a user profile associated with the user and an access control policy associated with the software application.

18. The method of claim 13, wherein the software application includes a first set of resources that is associated with the first security level and a second set of resources that are associated with a second security level, wherein resources in the first set of resources are accessible after being authorized by the general authorization procedure and the specific authorization procedure, and wherein the second set of resources are accessible after being authorized by the general authorization procedure.

19. The method of claim 18, wherein each resource in the first set of resources is associated with a unique specific authorization procedure, such that a user provides a different specific credential in connection with each unique specific authorization procedure.

20. The method of claim 18, wherein a resource in the first set of resources is a file that includes visible information and hidden information, wherein a user who is authorized by the general authorization procedure is permitted to access the visible information and a user who is authorized by the specific authorization procedure is permitted to access both the visible information and the hidden information.

21. The method of claim 18, wherein users are permitted to access the second set of resources after logging into their respective accounts that are associated with the software application, and wherein the users log into their respective accounts by providing a login credential to the software application, the login credential being different from the specific credential.

22. The method of claim 13, wherein the software application is running in a container on a container orchestration system, and wherein the general authorization procedure and the specific authorization procedure are executed by a sidecar that is associated with the container.

23. The method of claim 22, wherein the container orchestration system is implemented using Kubernetes and the sidecar uses Open Agent Policy (OPA) to implement access control.

24. The method of claim 22, wherein, when the software application receives a request from a user to access a resource of the software application, the software application transmits a request to have the sidecar authorize the user according to at least one of the general authorization procedure and the specific authorization procedure.

* * * * *